(12) United States Patent
Wolak

(10) Patent No.: US 10,654,620 B2
(45) Date of Patent: May 19, 2020

(54) MULTI-LAYER FILM

(71) Applicant: Berry Plastics Corporation, Evansville, IN (US)

(72) Inventor: Paul Z. Wolak, Indianapolis, IN (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

(21) Appl. No.: 15/334,991

(22) Filed: Oct. 26, 2016

(65) Prior Publication Data

US 2017/0113840 A1 Apr. 27, 2017

Related U.S. Application Data

(60) Provisional application No. 62/246,961, filed on Oct. 27, 2015.

(51) Int. Cl.
| | |
|---|---|
| *B32B 27/32* | (2006.01) |
| *B32B 27/34* | (2006.01) |
| *B32B 27/30* | (2006.01) |
| *B32B 7/12* | (2006.01) |
| *B32B 27/08* | (2006.01) |
| *B65D 30/08* | (2006.01) |

(Continued)

(52) U.S. Cl.
CPC ............... *B65D 31/04* (2013.01); *B32B 7/12* (2013.01); *B32B 27/08* (2013.01); *B32B 27/18* (2013.01); *B32B 27/308* (2013.01); *B32B 27/32* (2013.01); *B32B 27/327* (2013.01); *B32B 27/34* (2013.01); *B65D 33/16* (2013.01); *B32B 2250/05* (2013.01); *B32B 2250/24* (2013.01); *B32B 2270/00* (2013.01); *B32B 2307/31* (2013.01); *B32B 2307/50* (2013.01); *B32B 2307/581* (2013.01); *B32B 2307/5825* (2013.01); *B32B 2307/732* (2013.01); *B32B 2307/746* (2013.01); *B32B 2439/70* (2013.01)

(58) Field of Classification Search
CPC ............ B32B 2250/05; B32B 2250/24; B32B 2270/00; B32B 2307/31; B32B 2307/50; B32B 2307/581; B32B 2307/5825; B32B 2307/732; B32B 2307/746; B32B 2439/70; B32B 27/08; B32B 27/18; B32B 27/30; B32B 27/308; B32B 27/32; B32B 27/327; B32B 27/34; B32B 7/12; B65D 31/04; B65D 33/16
See application file for complete search history.

(56) References Cited

U.S. PATENT DOCUMENTS

| | | |
|---|---|---|
| 3,958,749 A | 5/1976 | Goodrich |
| 4,472,468 A | 9/1984 | Tailor |

(Continued)

FOREIGN PATENT DOCUMENTS

| | | |
|---|---|---|
| WO | 2007095667 | 9/2008 |
| WO | 2015057501 A1 | 4/2015 |
| WO | 2015123829 A1 | 8/2015 |

OTHER PUBLICATIONS

International (PCT) Search Report and Written Opinion for PCT/US17/35292 dated Aug. 29, 2017, 14 pages.

(Continued)

*Primary Examiner* — John D Freeman
(74) *Attorney, Agent, or Firm* — Barnes & Thornburg LLP

(57) ABSTRACT

A multi-layer film includes a skin layer and a seal layer. The multi-layer film may be used to form a package for a food product.

20 Claims, 3 Drawing Sheets

Figure 1:
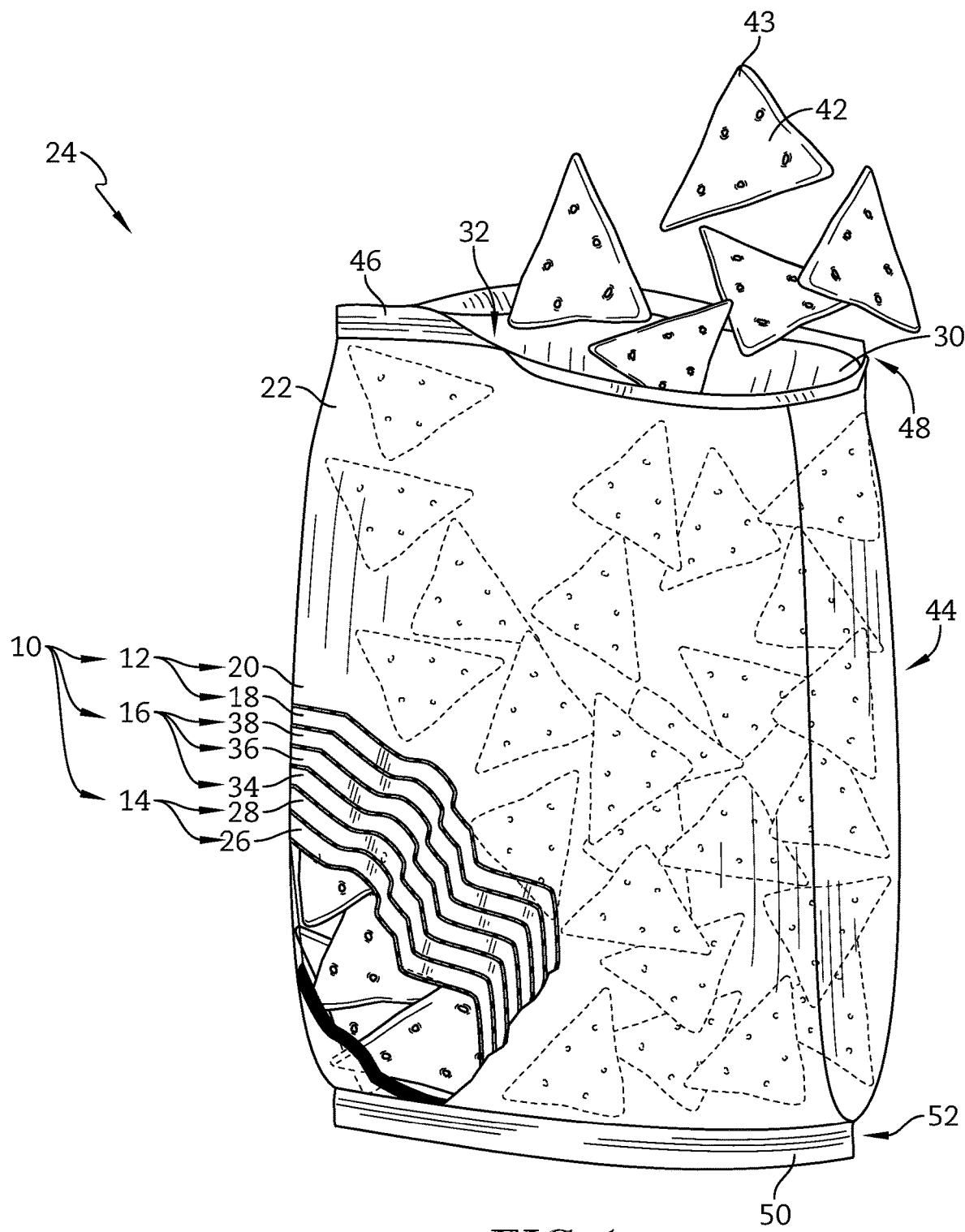

(51) Int. Cl.
  *B32B 27/18* (2006.01)
  *B65D 33/16* (2006.01)

(56) References Cited

U.S. PATENT DOCUMENTS

| | | | |
|---|---|---|---|
| 4,731,273 | A | 3/1988 | Bonk |
| 5,158,815 | A | 10/1992 | Doheny |
| 5,397,615 | A | 3/1995 | Van Beersel |
| 5,749,202 | A | 5/1998 | Eichbauer |
| 5,752,362 | A | 5/1998 | Eichbauer |
| 5,759,648 | A | 6/1998 | Idlas |
| 5,814,399 | A | 9/1998 | Eichbauer |
| 5,902,684 | A | 5/1999 | Bullard |
| 6,015,235 | A | 1/2000 | Kraimer |
| 6,206,569 | B1 | 3/2001 | Kraimer |
| 6,582,828 | B1 * | 6/2003 | Kaschel ............ B32B 27/32 428/476.9 |
| RE38,429 | E | 2/2004 | Eichbauer |
| 6,977,113 | B2 | 12/2005 | Kody |
| 7,052,772 | B2 | 5/2006 | Lottes |
| 7,235,607 | B2 | 6/2007 | Ohlsson |
| 7,622,406 | B2 | 11/2009 | Holland |
| 7,820,570 | B2 | 10/2010 | Holland |
| 7,828,029 | B2 | 11/2010 | Holland |
| 8,709,595 | B2 | 4/2014 | Siegel |
| 8,999,513 | B2 | 4/2015 | Custodero |
| 9,040,151 | B2 | 5/2015 | Pavlik |
| 9,126,269 | B2 | 9/2015 | Ohlsson |
| 2001/0046606 | A1 | 11/2001 | Tau |
| 2003/0049479 | A1 | 3/2003 | Quintin |
| 2006/0127657 | A1 | 6/2006 | Pettis |
| 2006/0183860 | A1 | 8/2006 | Mehta |
| 2006/0188678 | A1 * | 8/2006 | Ohlsson ............ B32B 7/02 428/35.7 |
| 2010/0151218 | A1 | 6/2010 | Curie |
| 2010/0249327 | A1 * | 9/2010 | Leland ............ C08J 5/18 525/240 |
| 2011/0244206 | A1 * | 10/2011 | Penache ............ B29B 9/02 428/220 |
| 2012/0100356 | A1 | 4/2012 | Ohlsson |
| 2012/0240511 | A1 | 9/2012 | Engelhard |
| 2013/0168958 | A1 | 7/2013 | Van Den Bergh |
| 2014/0370278 | A1 | 12/2014 | Hausmann |
| 2015/0344741 | A1 | 12/2015 | Blackwell |
| 2016/0244229 | A1 | 8/2016 | Lai |
| 2016/0332797 | A1 * | 11/2016 | Schnabel ............ B65D 65/40 |

OTHER PUBLICATIONS

International (PCT) Search Report and Written Opinion for PCT/US17/41082 dated Dec. 4, 2017, 15 pages.
International (PCT) Search Report for PCT/US16/58892 dated Jan. 24, 2017, 8 pages.
Office Action dated Oct. 1, 2018 for U.S. Appl. No. 15/643,982, (pp. 1-12).
Applied Plastics Engineering Handbook, 1st edition, edited by Myer Kutz, published Jul. 20, 2011, 2 pages.
Office Action dated Apr. 19, 2019 for U.S. Appl. No. 15/643,982, pp. 1-20.

* cited by examiner

MULTI-LAYER FILM

CROSS REFERENCE TO RELATED APPLICATIONS

This application claims priority under 35 U.S.C. § 119(e) to U.S. Provisional Patent Application No. 62/246,961, filed Oct. 27, 2015, which is expressly incorporated by reference herein.

BACKGROUND

The present disclosure relates to multi-layer films, and particularly to multi-layer films for use in packaging. More particularly, the present disclosure relates to packaging used for food products.

SUMMARY

According to the present disclosure, a multi-layer film is used to form a pouch for holding food products therein. The multi-layer film includes a seal layer and a skin layer. The seal layer is arranged to define an interior product-storage region in the pouch. The skin layer is arranged to surround and locate the seal layer between the interior product-storage region and the skin layer.

In illustrative embodiments, the multi-layer film further includes a puncture-resistant layer. The puncture-resistant layer extends between and interconnects the skin layer and the seal layer. The puncture-resistant layer is configured to provide means for minimizing puncture of the multi-layer film by objects extending through the multi-layer film from the seal layer through the skin layer so that the outer surface of the skin layer remains uninterrupted In illustrative embodiments, the skin layer includes a first skin sub-layer comprising an LLDPE material and a second skin sub-layer comprising an HDPE material. The first skin sub-layer extends between and interconnects the second skin sub-layer with the puncture-resistant layer. The second skins sub-layer forms the exterior surface of the package when the multi-layer film is used to make a package.

In illustrative embodiments, the seal layer includes a first seal layer comprising of an ionomer material and a second seal sub-layer comprising of an HDPE material. The second seal sub-layer extends between and interconnects the first seal sub-layer with the puncture-resistant layer. The first seal sub-layer forms the interior surface of the package when the multi-layer film is used to make a package.

In illustrative embodiments, the puncture-resistant layer includes a first puncture-resistant sub-layer comprising of a nylon material, a second puncture-resistant sub-layer comprising of an LLDPE material, and a third puncture-resistant sub-layer comprising of a polypropylene material. The first puncture-resistant sub-layer extends between and interconnects the seal layer with the second puncture-resistant sub-layer. The second puncture-resistant sub-layer extends between and interconnects the first puncture-resistant sub-layer with the third puncture-resistant sub-layer. The third puncture-resistant sub-layer extends between and interconnects the second puncture-resistant sub-layer with the skin layer.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
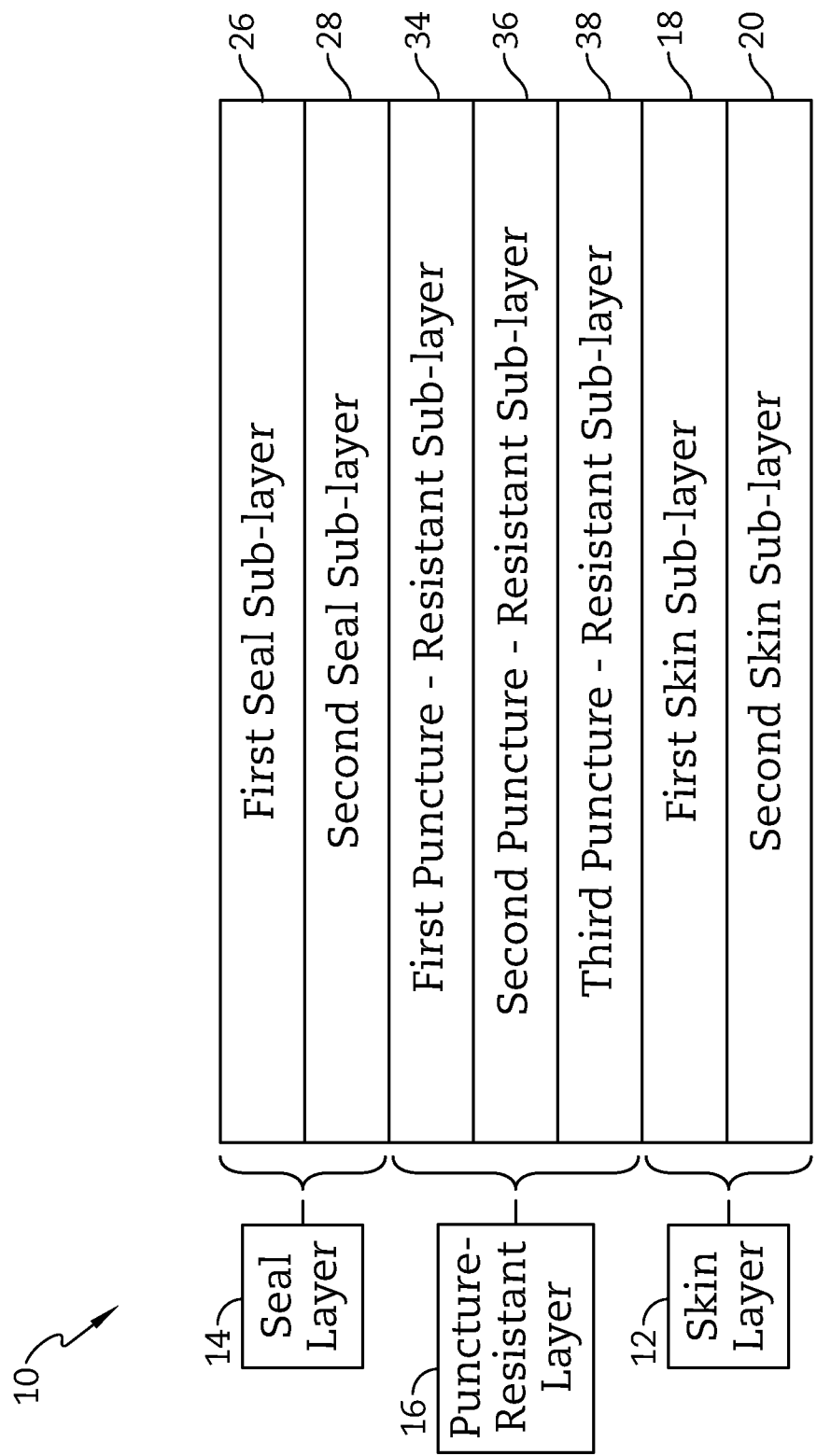
Figure 3:
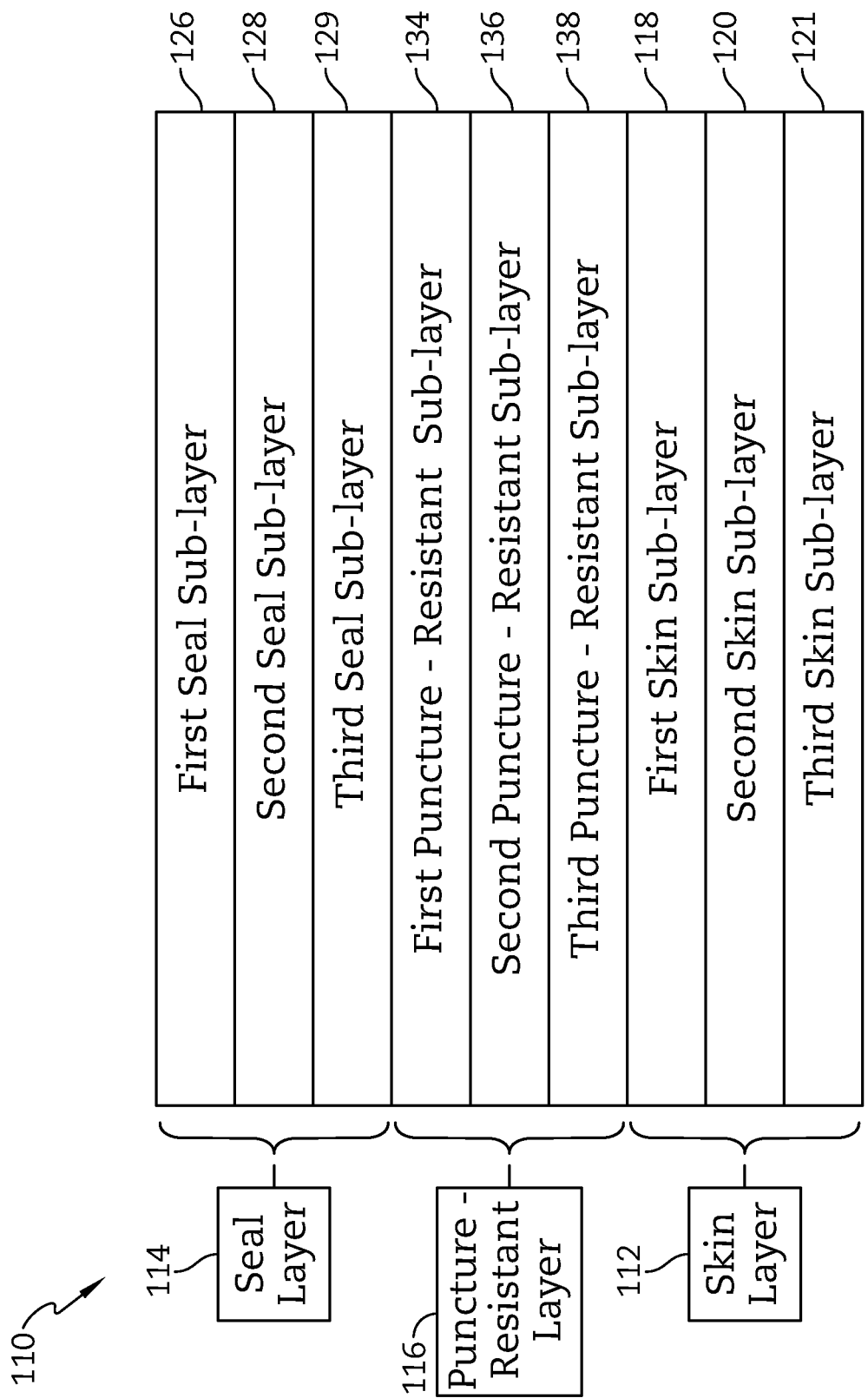

The detailed description particularly refers to the accompanying figures in which:

FIG. 1 is a perspective view of a package made from a multi-layer film in accordance with the present disclosure showing that the package includes a pouch formed to include an interior product-storage region, a first closure that has been partially unsealed to allow access into the interior product-storage region for filling the package with a food product, and a sealed second closure, and further showing the multi-layer film includes, in order from outside to inside, a seal layer, a puncture-resistant layer, and a skin layer;

FIG. 2 is a diagrammatic view of the multi-layer film that forms the package of FIG. 1 showing that the multi-layer film includes, from top to bottom, a seal layer including two sub-layers, a puncture-resistant layer including three sub-layers, and a skin layer including two sub-layers; and FIG. 3 is a diagrammatic view of another embodiment of a multi-layer film in accordance with the present disclosure showing that the multi-layer film includes, from top to bottom, a seal layer including three sub-layers, a puncture-resistant layer including three sub-layers, and a seal layer including three sub-layers.

DETAILED DESCRIPTION

A first embodiment of a multi-layer film 10 in accordance with the present disclosure is shown, for example, in FIGS. 1 and 2. Multi-layer film 10 may be formed into a package 24 as shown in FIG. 1 to hold food products 42 in an interior product-storage region 32 formed in package 24 without food products 42 puncturing package 24. A second embodiment of a multi-layer film 110 in accordance with the present disclosure is shown in FIG. 3.

Multi-layer film 10 includes a skin layer 12, a seal layer 14, and a puncture-resistant layer 16 as shown in FIGS. 1 and 2. Skin layer 12 is located in spaced-apart relation to seal layer 14. Puncture-resistant layer 16 extends between and interconnects skin layer 12 and seal layer 14. Skin layer 12, seal layer 14, and puncture-resistant layer 16 cooperate to minimize puncture of multi-layer film 10 by objects extending through multi-layer film 10.

Multi-layer film 10, in one example, may be used to form a package 24, as shown in FIG. 1. Package 24 includes a pouch 44 configured to hold a food product 42, a first closure 46, and a second closure 50 located in spaced-apart relation to first closure 46. Illustratively, food product 42 may have an edge 43 which may be sharp. Package 24 made from multi-layer film 10 resists puncture or cutting of multi-layer film 10 by edge 43 of food products 42 during filling at a factory or during transportation.

Multi-layer film 10 is, for example, a co-extruded film in which skin layer 12, seal layer 14, and puncture-resistant layer 16 each comprise a composition. Illustratively, each composition is formed by processing a formulation. Illustratively, each formulation of skin layer 12, seal layer 14, or puncture-resistant layer 16 may be added to a hopper on an extrusion machine and heated to produce a molten material in the extruder. The molten material of each of skin layer 12, seal layer 14, and puncture-resistant layer 16 may be co-extruded to produce multi-layer film 10.

In an embodiment, each of skin layer 12, seal layer 14, and puncture-resistant layer 16 may include a number of sub-layers as shown in FIGS. 1-3. In another embodiment, skin layer 12 includes a first skin sub-layer 18 and a second skin sub-layer 20. Seal layer 14 includes first seal sub-layer 26 and second seal sub-layer 28. Puncture-resistant layer 16 includes a first puncture-resistant sub-layer 34, a second puncture-resistant sub-layer 36, and a third puncture-resistant sub-layer 38. In total, multi-layer film 10 includes seven sub-layers. In another embodiment, multi-layer film 110 includes nine sub-layers. In another embodiment, a multi-layer film may have a skin layer 12, a seal layer 14, and a puncture-resistant layer 16 with any number of sub-layers.

In certain embodiments, each sub-layer of multi-layer film 10 may comprise a composition. Each sub-layer may comprise, for example, a plastic polymer, a material, or a resin, and may optionally include one or more additives. Examples of plastic polymers, resins, or materials suitable for forming a multi-layer film include high-density polyethylene (HDPE), linear low-density polyethylene (LLDPE), metallocene modified LLDPE (mLLDPE), nylon, ionomers, modified LLDPE, polypropylene (PP), polypropylene copolymers (PP-CoP), and combinations thereof. Illustratively, each composition is formed from a formulation that is processed in an extruder. Process additives, such as slip agents and anti-block agents, may be added to the formulations to improve the extrusion process and provide additional properties of multi-layer film 10.

Multi-layer film 10 may be used on a filling machine to form a package 24 for holding a food product 42 as shown in FIG. 1. Multi-layer film 10 may form package 24 so that seal layer 14 provides an interior surface 30 of package 24 and skin layer 12 forms an exterior surface 22.

Package 24 may be sealed at second end 52 to form second closure 50 and pouch 44 as shown in FIG. 1. Food product 42 may then be added to pouch 44. During the filling process of pouch 44, multi-layer film 10 minimizes puncture of food product 42 from interior surface 30 through to exterior surface 22 so pouch 44 remains uninterrupted. Once the filling operation is complete, package 24 may be sealed at first end 48 to form first closure 46. In an embodiment, first closure 46 and second closure 50 are formed by a heat-sealing process.

Multi-layer film 10 includes skin layer 12, seal layer 14, and puncture-resistant layer 16 as shown in FIGS. 1 and 2. Skin layer 12 is located in spaced-apart relation to seal layer 14. Puncture-resistant layer 16 extends between and interconnects skin layer 12 and seal layer 14.

In an embodiment, multi-layer film 10 is about 2.5 mils to about 3.5 mils thick. Multi-layer film 10 may be a particular thickness or fall within one of several different ranges. The thickness of multi-layer film 10 may be one of the following values: about 2.5 mils, about 2.6 mils, about 2.7 mils, about 2.8 mils, about 2.9 mils, about 3 mils, about 3.1 mils, about 3.2 mils, about 3.25 mils, about 3.3 mils, about 3.4 mils, and about 3.5 mils. The thickness of multi-layer film 10 may fall within one of many different ranges. In a set of ranges, the thickness of multi-layer film 10 is one of the following ranges: about 2.5 mils to about 3.5 mils, about 2.7 mils to about 3.5 mils, about 2.9 mils to about 3.5 mils, about 3 mils to about 3.5 mils, and about 3 mils to about 3.4 mils. In an embodiment, multi-layer film 10 is about 3.25 mils thick.

Skin layer 12 includes first skin sub-layer 18 and second skin sub-layer 20 as shown in FIGS. 1 and 2. First skin sub-layer 18 is configured to extend between and interconnect second skin sub-layer 20 and puncture-resistant layer 16. In an embodiment, skin layer 12 is about 30% to about 60% of the overall thickness of multi-layer film 10. Skin layer 12 may be one of several different percentages of thickness of multi-layer film 10 or fall within one of several different ranges. The percentage of thickness of skin layer 12 may be one of the following values: about 20%, about 25%, about 30%, about 35%, about 40%, about 45%, about 50%, about 51%, about 52%, about 53%, about 54%, about 55%, about 60%, about 65%, and about 70% of the total thickness of multi-layer film 10. The thickness of skin layer 12 of multi-layer film 10 may fall within one of many different ranges. In a set of ranges, the thickness of skin layer 12 is one of the following ranges: about 20% to about 70%, about 25% to about 65%, about 30% to about 60%, about 35% to about 65%, about 40% to about 60%, and about 40% to about 5% of the total thickness of multi-layer film 10. In an embodiment, skin layer 12 is about 53% of the total thickness of multi-layer film 10.

In an embodiment, skin layer 12 is about 1 mil to about 3 mils thick. Skin layer 12 may be a particular thickness or fall within one of several different ranges. The thickness of skin layer 12 may be one of the following values: about 1 mil, about 1.2 mils, about 1.4 mils, about 1.5 mils, about 1.6 mils, about 1.7 mils, about 1.8 mils, about 1.9 mils, about 2 mils, about 2.2 mils, about 2.4 mils, about 2.6 mils, about 2.8 mils and about 3 mils. The thickness of skin layer 12 may fall within one of many different ranges. In a set of ranges, the thickness of skin layer 12 is one of the following ranges: about 1 mil to about 3 mils, about 1.2 mils to about 3 mils, about 1.2 mils to about 2.6 mils, about 1.2 mils to about 2.4 mils, and about 1.2 mils to about 2 mils. In an embodiment, skin layer 12 is about 1.7 mils thick.

First skin sub-layer 18 extends between and interconnects second skin sub-layer 20 and puncture-resistant layer 16, as shown in FIGS. 1 and 2. Illustratively, first skin sub-layer 18 may be a tie-layer.

In an embodiment, first skin sub-layer 18 is about 3% to about 20% of the total thickness of multi-layer film 10. First skin sub-layer 18 may be one of several different percentages of the total thickness of multi-layer film 10 or fall within one of several different ranges. The percentage thickness of first skin sub-layer 18 of multi-layer film 10 may be one of the following values: about 3%, about 5%, about 6%, about 7%, about 8%, about 9%, about 10%, about 15%, and about 20% of the total thickness of multi-layer film 10. It is within the present disclosure for the thickness of first skin sub-layer 18 to fall within one of many different ranges. In a set of ranges, the thickness range of first skin sub-layer 18 is one of the following ranges: about 3% to about 20%, about 5% to about 20%, about 5% to about 15%, about 5% to about 13%, and about 6% to about 12% of the total thickness multi-layer film 10. In an example, first skin sub-layer 18 may be about 8% of the total thickness of multi-layer film 10.

In an embodiment, first skin sub-layer 18 is about 0.1 mils to about 0.5 mils thick. First skin sub-layer 18 may be a particular thickness or fall within one of several different ranges. The thickness of first skin sub-layer 18 may be one of the following values: about 0.1 mils, about 0.2 mils, about 0.23 mils, about 0.24 mils, about 0.25 mils, about 0.26 mils, about 0.27 mils, about 0.28 mils, about 0.3 mils, about 0.32 mils, about 0.34 mils, about 0.35 mils, about 0.4 mils and about 0.5 mils. The thickness of first skin sub-layer 18 may fall within one of many different ranges. In a set of ranges, the thickness of first skin sub-layer 18 is one of the following ranges: about 0.1 mils to about 0.5 mils, about 0.1 mils to about 0.4 mils, about 0.2 mils to about 0.4 mils, about 0.2 mils to about 0.35 mils, and about 0.2 mils to about 0.3 mils. In an embodiment, first skin sub-layer 18 is about 0.26 mils thick.

In an embodiment, first skin sub-layer 18 comprises an LLDPE material. In another embodiment, the LLDPE material is a metallocene modified mLLDPE. In yet another embodiment, the LLDPE material has a melt flow index of about 1.0. In an exemplary embodiment, the mLLDPE material is ExxonMobil® Exceed™ 1018HA.

Second skin sub-layer 20 is located in spaced-apart relation to first skin sub-layer 18 as shown in FIGS. 1 and 2. In an embodiment, second skin sub-layer 20 may provide exterior surface 22 when multi-layer film 10 forms package 24.

In an embodiment, second skin sub-layer 20 is about 20% to about 70% of the total thickness of multi-layer film 10. Second skin sub-layer 20 may be one of several different percentages of the total thickness of multi-layer film 10 or fall within one of several different ranges. The percentage thickness of second skin sub-layer 20 of multi-layer film 10 may be one of the following values: about 20%, about 25%, about 30%, about 35%, about 40%, about 45%, about 50%, about 55%, about 60%, about 65%, and about 70% of the total thickness multi-layer film 10. It is within the scope of the present disclosure for the thickness of second skin sub-layer 20 to fall within one of many different ranges. In a set of ranges, the thickness range of second skin sub-layer 20 is one of the following ranges: about 20% to about 70%, about 25% to about 65%, about 30% to about 60%, about 35% to about 55%, and about 40% to about 50%, of the total thickness multi-layer film 10. In an example, second skin sub-layer 20 may be about 45% of the overall thickness multi-layer film 10.

In an embodiment, second skin sub-layer 20 is about 1 mil to about 2 mils thick. Second skin sub-layer 20 may be a particular thickness or fall within one of several different ranges. The thickness of second skin sub-layer 20 may be one of the following values: about 1 mil, about 1.2 mils, about 1.3 mils, about 1.4 mils, about 1.42 mils, about 1.44 mils, about 1.46 mils, about 1.48 mils, about 1.6 mils, about 1.6 mils, about 1.7 mils, about 1.8 mils, about 1.9 mils and about 2 mils. The thickness of second skin sub-layer 20 may fall within one of many different ranges. In a set of ranges, the thickness of second skin sub-layer 20 is one of the following ranges: about 1 mil to about 2 mils, about 1 mil to about 1.8 mils, about 1 mil to about 1.7 mils, about 1.2 mils to about 1.7 mils, and about 1.3 mils to about 1.6 mils. In an embodiment, second skin sub-layer 20 is about 1.46 mils thick.

In an embodiment, second skin sub-layer 20 comprises an HDPE material. In another embodiment, the HDPE material has a melt flow index of about 0.9. In yet another embodiment, the HDPE material is Dow® Elite™ 5960G. In an example, second skin sub-layer 20 further comprises an mLLDPE material. In an embodiment, the mLLDPE resin has a melt flow index of about 1.0. In another embodiment, the mLLDPE is ExxonMobil® Exceed™ 1018HA. In an example, second skin sub-layer 20 comprises a blend of Dow® Elite™ 5960G and ExxonMobil® Exceed™ 1018HA.

In an embodiment, second skin sub-layer 20 comprises a blend of an HDPE material and an mLLDPE material. In certain embodiments, second skin sub-layer 20 may comprise a percentage of an HDPE material, and the remainder of second skin sub-layer 20 comprises a percentage of an mLLDPE material. Second skin sub-layer 20 may be one of several different percentages of an HDPE material or fall within one of several different ranges. The amount of an HDPE material for second skin sub-layer 20 may be selected from the following values: about 85%, about 90%, about 92%, about 93%, about 94%, about 95%, about 96%, and about 97%. It is within the scope of the present disclosure to select an amount of an mLLDPE material for second skin sub-layer 20 from the following values: about 15%, about 10%, about 8%, about 7%, about 6%, about 5%, about 4%, and about 3%. In an example, second skin sub-layer 20 comprises a blend of about 95% of an HDPE material and about 5% of an mLLDPE material. In yet another embodiment, second skin sub-layer 20 comprises a blend of about 95% Dow® Elite™ 5960G and about 5% ExxonMobil® Exceed™ 1018HA.

Seal layer 14 includes a first seal sub-layer 26 and a second seal sub-layer 28 as shown in FIGS. 1 and 2. Second seal sub-layer 28 is arranged to extend between and interconnect first seal sub-layer 26 with puncture-resistant layer 16. In an embodiment, seal layer 14 may form the interior surface 30 when multi-layer film 10 is used to form package 24.

In an embodiment, seal layer 14 is about 5% to about 40% of total thickness of multi-layer film 10. Seal layer 14 may be one of several different percentages of thickness of multi-layer film 10 or fall within one of several different ranges. The percentage thickness of seal layer 14 of multi-layer film 10 may be one of the following values: about 5%, about 10%, about 15%, about 20%, about 25%, about 30%, and about 40% of the total thickness of multi-layer film 10. The percentage thickness of seal layer 14 may fall within one of many different ranges. In a set of ranges, the thickness range of seal layer 14 is one of the following ranges: about 5% to about 40%, about 10% to about 40%, about 15% to about 40%, about 15% to about 35%, about 15% to about 30%, and about 15% to about 25% of the total thickness of multi-layer film 10. In an embodiment, seal layer 14 is about 20% of the total thickness of multi-layer film 10.

In an embodiment, seal layer 14 is about 0.3 mils to about 0.9 mils thick. Seal layer 14 may be a particular thickness or fall within one of several different ranges. The thickness of seal layer 14 may be one of the following values: about 0.3 mils, about 0.4 mils, about 0.5 mils, about 0.55 mils, about 0.6 mils, about 0.63 mils, about 0.64 mils, about 0.65 mils, about 0.66 mils, about 0.67 mils, about 0.7 mils, about 0.75 mils, about 0.8 mils and about 0.9 mils. The thickness of seal layer 14 may fall within one of many different ranges. In a set of ranges, the thickness of seal layer 14 is one of the following ranges: about 0.3 mils to about 0.9 mils, about 0.4 mils to about 0.9 mils, about 0.4 mils to about 0.8 mils, about 0.5 mils to about 0.8 mils, and about 0.6 mils to about 0.8 mils. In an embodiment, seal layer 14 is about 0.65 mils thick.

First seal sub-layer 26 is located in spaced-apart relation to second seal sub-layer 28 as shown in FIGS. 1 and 2. In an embodiment, first seal sub-layer 26 may form interior surface 30 if multi-layer film 10 is used to form package 24. Illustratively, first seal sub-layer 26 is the surface that contacts food products in interior product-storage region 32.

In another embodiment, first seal sub-layer 26 is about 5% to about 20% of the overall thickness of multi-layer film 10. First seal sub-layer 26 may be one of several different percentages of thickness of multi-layer film 10 or fall within one of several different ranges. The percentage thickness of first seal sub-layer 26 of multi-layer film 10 may be one of the following values: about 5%, about 6%, about 7%, about 8%, about 9%, about 10%, about 11%, about 12%, about 13%, about 14%, about 15%, about 16%, about 17%, about 18%, about 19%, and about 20% of the total thickness of multi-layer film 10. The percentage thickness of first seal sub-layer 26 of multi-layer film 10 may fall within one of many different ranges. In a set of ranges, the thickness range of first seal sub-layer 26 may be one of the following ranges: about 5% to about 20%, about 5% to about 18%, about 5% to about 15%, about 8% to about 15%, about 8% to about 13%, and about 10% to about 13% of the total thickness multi-layer film 10. In an example, first seal sub-layer 26 may be about 12% of the overall thickness of multi-layer film 10.

In an embodiment, first seal sub-layer 26 is about 0.2 mils to about 0.8 mils thick. First seal sub-layer 26 may be a particular thickness or fall within one of several different ranges. The thickness of first seal sub-layer 26 may be one of the following values: about 0.2 mils, about 0.25 mils, about 0.3 mils, about 0.35 mils, about 0.37 mils, about 0.38 mils, about 0.39 mils, about 0.4 mils, about 0.41 mils, about 0.42 mils, about 0.45 mils, about 0.5 mils, about 0.6 mils, and about 0.8 mils. The thickness of first seal sub-layer 26 may fall within one of many different ranges. In a set of ranges, the thickness of first seal sub-layer 26 is one of the following ranges: about 0.2 mils to about 0.8 mils, about 0.2 mils to about 0.6 mils, about 0.2 mils to about 0.5 mils, about 0.2 mils to about 0.45 mils, and about 0.35 mils to about 0.45 mils. In an embodiment, first seal sub-layer 26 is about 0.39 mils thick.

In an embodiment, first seal sub-layer 26 comprises an ionomer material. In an embodiment, the ionomer material may be a zinc (Zn) ionomer material. In another embodiment, the Zn ionomer material has a melt flow index of about 1.4. In another example, first seal sub-layer further comprises a second ionomer material. In another embodiment, the second ionomer material has a melt flow index of about 1.3. In another embodiment, the second ionomer material is a sodium (Na) ionomer material. In yet another embodiment, the first seal sub-layer comprises a blend of DuPont™ Surlyn® 1825 and DuPont™ Surlyn® 1601-2.

In an embodiment, first seal sub-layer 26 may comprise a Zn ionomer material and a Na ionomer material. The percentage amount of the Zn ionomer material in the first seal sub-layer may be one of the following values: about 50%, about 55%, about 60%, about 65%, about 70%, or about 75% by weight of the formulation of first seal sub-layer 26. The percentage of Zn ionomer material of the first seal layer may fall within one of many different ranges. In a set of ranges, the percentage of the Zn ionomer material of the first seal layer is one of the following ranges: about 30% to about 80%, about 40% to about 80%, about 50% to about 80%, about 55% to about 80%, about 55% to about 70%, and about 65% to about 70% of the total by weight percentage of the first seal sub-layer. The percentage amount of the Na ionomer material in the first seal sub-layer formulation may be one of the following values: about 45%, about 40%, about 35%, about 30%, about 25%, about 20%, and about 15% by weight of the formulation of first seal sub-layer 26. In certain embodiments, the Na ionomer material of the first seal layer formulation may fall within one of many different ranges. In a set of ranges, the percentage of the Na ionomer material of the first seal layer formulation is one of the following ranges: about 15% to about 45%, about 15% to about 40%, about 15% to about 35%, about 20% to about 35%, about 20% to about 30%, and about 21% to about 28% of the total by weight percentage of the first seal sub-layer formulation. In an embodiment, first seal sub-layer 26 comprises about 67.5% of a Zn ionomer and about 25% of a Na ionomer material. In an exemplary embodiment, first seal sub-layer 26 comprises about 67.5% DuPont™ Surlyn® 1825 and about DuPont™ Surlyn® 1601-2.

In an embodiment, described herein, first seal sub-layer 26 may optionally include one or more process additives such as slip agents or anti-block agents. In an embodiment, first seal sub-layer 26 includes a slip agent. In another embodiment, first seal sub-layer 26 includes an anti-block agent. In yet another embodiment, first seal sub-layer 26 includes a slip agent and an anti-block agent. Illustratively, the slip agent may be an amide type slip agent. In an embodiment, the slip agent may be DuPont™ Conpol® 20S1. In certain embodiments, the percentage by weight of the slip agent may fall within a set of ranges including, about 1% to about 10%, about 2% to about 10%, about 3% to about 10%, and about 3% to about 5%. Illustratively, the anti-block agent may be talc. In an embodiment, the anti-block agent may be talc in ethyl methyl acrylate (EMA). In another embodiment, the anti-block agent may be ABC5000PBMA available from the Polyfil Corporation. In certain embodiments, the percentage by weight of the anti-block agent may fall within a set of ranges including about 1% to about 10%, about 2% to about 10%, about 3% to about 10%, and about 3% to about 5%.

In an exemplary embodiment, first seal sub-layer 26 may comprise a combination of a Zn ionomer material, a Na ionomer material, a slip agent, and an anti-block agent. In an embodiment, first seal sub-layer 26 may comprise about 67.5% Zn ionomer, about 25% Na ionomer, about 4% slip agent, and about 3.5% anti-block agent. In yet another embodiment, first seal sub-layer 26 may comprise about 67.5% DuPont™ Surlyn® 1825, about 25% DuPont™ Surlyn® 1601-2, about 4% DuPont™ Conpol® 20S1, and about 3.5% Polyfil ABC5000PBMA.

Second seal sub-layer 28 extends between and interconnects first seal sub-layer 26 and puncture-resistant layer 16, as shown in FIGS. 1 and 2. Illustratively, second seal sub-layer 28 may be a tie-layer.

In an embodiment, second seal sub-layer 28 is about 5% to about 20% of the total thickness multi-layer film 10. Second seal sub-layer 28 may be one of several different percentages of thickness of multi-layer film 10 or fall within one of several different ranges. In certain embodiments, the percentage of second seal sub-layer 28 may be one of the following values: about 5%, about 6%, about 7%, about 8%, about 9%, about 10%, about 11%, about 12%, about 15%, and about 20% of the total thickness of multi-layer film 10. The percentage thickness of second seal sub-layer 28 of multi-layer film 10 may fall within one of many different ranges. In a set of ranges, the thickness range of second seal sub-layer 28 is one of the following ranges: about 5% to about 20%, about 5% to about 15%, about 5% to about 13%, and about 6% to about 12% of the total thickness multi-layer film 10. In an example, second seal sub-layer 28 may be about 8% of the overall thickness of multi-layer film 10.

In an embodiment, second seal sub-layer 28 is about 0.1 mils to about 0.5 mils thick. Second seal sub-layer 28 may be a particular thickness or fall within one of several different ranges. The thickness of second seal sub-layer 28 may be one of the following values: about 0.1 mils, about 0.2 mils, about 0.23 mils, about 0.24 mils, about 0.25 mils, about 0.26 mils, about 0.27 mils, about 0.28 mils, about 0.3 mils, about 0.32 mils, about 0.34 mils, about 0.35 mils, about 0.4 mils, and about 0.5 mils. The thickness of second seal sub-layer 28 may fall within one of many different ranges. In a set of ranges, the thickness of second seal sub-layer 28 is one of the following ranges: about 0.1 mils to about 0.5 mils, about 0.1 mils to about 0.4 mils, about 0.2 mils to about 0.4 mils, about 0.2 mils to about 0.35 mils, and about 0.2 mils to about 0.3 mils. In an embodiment, second seal sub-layer 28 is about 0.26 mils thick.

In an embodiment, second seal sub-layer 28 comprises an HDPE material. In another embodiment, the HDPE material has a melt flow index of about 1.2. In an embodiment, the HDPE material is Nova Chemicals® SURPASS® HPs167-AB. In an example, second seal sub-layer 28 further comprises a modified LLDPE material. In an embodiment, the LLDPE is modified to contain an anhydride and may act as an adhesive. In another embodiment, the modified LLDPE has a melt flow index of about 2.7. In another embodiment, the modified LLDPE is DuPont™ Bynel® 41E710. In an example, second skin sub-layer 20 comprises a combination of Nova Chemicals® SURPASS® HPs167-AB and DuPont™ Bynel® 41E710.

In certain embodiments, second seal sub-layer 28 may comprise a percentage by weight of an HDPE material a percentage by weight of an LLDPE material. Second seal sub-layer 28 may comprise one of several different percentages of an HDPE material or fall within one of several different ranges. It is within the scope of the present disclosure to select an amount of an HDPE material for second seal sub-layer 28 from the following values: about 70%, about 75%, about 80%, about 85%, about 90%, and about 95% by weight of second seal sub-layer 28. The amount of the HDPE material may fall within a series of ranges including about 75% to about 95%, about 75% to about 90%, about 80% to about 90%, and about 82% to about 88% by weight of second seal sub-layer 28. Second seal sub-layer 28 may comprise a percentage by weight of an LLDPE material selected from the following values: about 30%, about 25%, about 20%, about 15%, about 10%, and about 5% by weight of second seal sub-layer 28. The amount of the LLDPE material may fall within a series of ranges including about 5% to about 30%, about 5% to about 25%, about 10% to about 25%, about 10% to about 20%, and about 12% to about 18% by weight of second seal sub-layer 28. In an example, second seal sub-layer 28 comprises about 85% by weight of an HDPE material and about 15% by weight of an LLDPE material. In another embodiment, second seal sub-layer 28 comprises about 85% Nova Chemicals® SURPASS® HPs167-AB and about 15% DuPont™ Bynel® 41E710.

Puncture-resistant layer 16 includes first puncture-resistant sub-layer 34, second puncture-resistant sub-layer 36, and third puncture-resistant sub-layer 38 as shown in FIGS. 1 and 2. First puncture-resistant sub-layer 34 is configured to extend between and interconnect seal layer 14 with second puncture-resistant sub-layer 36. Second puncture-resistant sub-layer 36 is configured to extend between and interconnect first puncture-resistant sub-layer 34 and third puncture-resistant sub-layer 38. Third puncture-resistant sub-layer 38 is configured to extend between and interconnect second puncture-resistant sub-layer 36 and skin layer 12.

In an embodiment, puncture-resistant layer 16 is about 15% to about 40% % of the total thickness multi-layer film 10. Puncture-resistant layer 16 may be one of several different percentages of thickness of multi-layer film 10 or fall within one of several different ranges. The percentage thickness of puncture-resistant layer 16 of multi-layer film 10 may be one of the following values: about 15%, about 20%, about 25%, about 26%, about 27%, about 28%, about 29%, about 30%, about 35%, and about 40% of the total thickness of multi-layer film 10. The percentage thickness of puncture-resistant layer 16 of multi-layer film 10 may fall within one of many different ranges. In a set of ranges, the thickness range of skin layer 12 is one of the following ranges: about 15% to about 40%, about 20% to about 40%, about 20% to about 35%, about 25% to about 35%, and about 25% to about 30% of the total thickness of multi-layer film 10. In an embodiment, puncture-resistant layer 16 is about 27% of the total thickness of multi-layer film 10.

In an embodiment, puncture-resistant layer 16 is about 0.5 mils to about 1.5 mils thick. Puncture-resistant layer 16 may be a particular thickness or fall within one of several different ranges. The thickness of puncture-resistant layer 16 may be one of the following values: about 0.5 mils, about 0.6 mils, about 0.7 mils, about 0.8 mils, about 0.85 mils, about 0.86 mils, about 0.87 mils, about 0.88 mils, about 0.89 mils, about 0.9 mils, about 0.91 mils, about 0.95 mils, about 1 mil, about 1.2 mils, and about 1.5 mils. The thickness of puncture-resistant layer 16 may fall within one of many different ranges. In a set of ranges, the thickness of puncture-resistant layer 16 is one of the following ranges: about 0.5 mils to about 1.5 mils, about 0.5 mils to about 1.2 mils, about 0.7 mils to about 1.2 mils, about 0.7 mils to about 1 mil, and about 0.8 mils to about 1 mil. In an embodiment, puncture-resistant layer 16 is about 0.88 mils thick.

First puncture-resistant sub-layer 34 extends between and interconnects second puncture-resistant sub-layer 36 and seal layer 14, as shown in FIGS. 1 and 2. In an embodiment, first puncture-resistant sub-layer 34 comprises a nylon material. In an embodiment, the nylon material has a relative viscosity between 3.19 and 3.41 as measured by ISO 307. In yet another embodiment, the nylon material is a lubricated copolyamide 6/66 grade material. In an exemplary embodiment, the nylon material is BASF® Ultramid® C33 L.

In an embodiment, first puncture-resistant sub-layer 34 is about 5% to about 20% of the total thickness of multi-layer film 10. First puncture-resistant sub-layer 34 may be one of several different percentages of thickness of multi-layer film 10 or fall within one of several different ranges. The percentage thickness of first puncture-resistant sub-layer 34 of multi-layer film 10 may be one of the following values: about 5%, about 7%, about 8%, about 9%, about 10%, about 11%, about 12%, about 15%, and about 20% of the total thickness of multi-layer film 10. The percentage thickness of first puncture-resistant sub-layer 34 of multi-layer film 10 may fall within one of many different ranges. In a set of ranges, the thickness range of first puncture-resistant sub-layer 34 is one of the following ranges: about 5% to about 20%, about 5% to about 15%, about 5% to about 13%, about 7% to about 13%, and about 7% to about 10% of the total thickness multi-layer film 10. In an example, first puncture-resistant sub-layer 34 may be about 9% of the overall thickness of multi-layer film 10.

In an embodiment, first puncture-resistant sub-layer 34 is about 0.1 mils to about 0.5 mils thick. First puncture-resistant sub-layer 34 may be a particular thickness or fall within one of several different ranges. The thickness of first puncture-resistant sub-layer 34 may be one of the following values: about 0.1 mils, about 0.2 mils, about 0.25 mils, about 0.28 mils, about 0.29 mils, about 0.291 mils, about 0.292 mils, about 0.293 mils, about 0.294 mils, about 0.295 mils, about 0.3 mils, about 0.31 mils, about 0.33 mils, about 0.35 mils, about 0.4 mils, and about 0.5 mils. The thickness of first puncture-resistant sub-layer 34 may fall within one of many different ranges. In a set of ranges, the thickness of first puncture-resistant sub-layer 34 is one of the following ranges: about 0.1 mils to about 0.5 mils, about 0.1 mils to about 0.4 mils, about 0.2 mils to about 0.4 mils, about 0.2 mils to about 0.35 mils, and about 0.2 mils to about 0.3 mils. In an embodiment, first puncture-resistant sub-layer 34 is about 0.293 mils thick.

Second puncture-resistant sub-layer 36 extends between and interconnects first puncture-resistant sub-layer 34 and third puncture-resistant sub-layer 38, as shown in FIGS. 1 and 2. Illustratively, second puncture-resistant sub-layer 36 may serve as a tie-layer.

In an embodiment, second puncture-resistant sub-layer 36 comprises an LLDPE material. In another embodiment, the LLDPE material has a melt flow index of about 1.0. In an embodiment, the LLDPE material is a metallocene modified mLLDPE. In an embodiment, the mLLDPE material is ExxonMobil® Exceed™ 1018HA. In an example, second puncture-resistant sub-layer 36 further comprises a second LLDPE material. In an embodiment, the second LLDPE material is modified LLDPE that is modified anhydride and may act as an adhesive. In an embodiment, the modified LLDPE resin has a melt flow index of about 2.7. In another embodiment, the modified LLDPE is DuPont™ Bynel® 41E710. In an example, second skin sub-layer 20 comprises a combination of ExxonMobil® Exceed™ 1018HA and DuPont™ Bynel® 41E710.

In an embodiment, second puncture-resistant sub-layer 36 comprises a an mLLDPE material and a modified LLDPE material. Second puncture-resistant sub-layer 36 may comprise a percentage by weight of an mLLDPE material and a percentage of a modified LLDPE material. Second puncture-resistant sub-layer 36 may be one of several different percentages of an mLLDPE material or fall within one of several different ranges. The percentage by weight amount of an mLLDPE material for second puncture-resistant sub-layer 36 may be selected from the following values: about 70%, about 75%, about 80%, about 85%, about 90%, and about 95%. The amount of the mLLDPE material may fall within a series of ranges including about 70% to about 95%, about 70% to about 90%, about 5% to about 90%, about 80% to about 90%, and about 82% to about 88% by weight of second puncture-resistant sub-layer 36. The percentage by weight amount of a modified LLDPE material for second puncture-resistant sub-layer 36 may be selected from the following values: about 30%, about 25%, about 20%, about 15%, about 10%, and about 5% by weight of second seal sub-layer 28. The amount of the modified LLDPE material may fall within a series of ranges including about 5% to about 30%, about 5% to about 25%, about 10% to about 25%, about 10% to about 20%, and about 12% to about 18% by weight of second puncture-resistant sub-layer 36. In an example, second puncture-resistant sub-layer 36 comprises about 85% of an mLLDPE material and about 15% of a modified LLDPE material. In another example, second puncture-resistant sub-layer 36 comprises about 85% ExxonMobil® Exceed™ 1018HA and about 15% DuPont™ Bynel® 41E710.

In an embodiment, second puncture-resistant sub-layer 36 is about 3% to about 20% of the total thickness of multi-layer film 10. Second puncture-resistant sub-layer 36 may be one of several different percentages of the total thickness of multi-layer film 10 or fall within one of several different ranges. The percentage thickness of second puncture-resistant sub-layer 36 of multi-layer film 10 may be one of the following values: about 3%, about 5%, about 6%, about 7%, about 8%, about 9%, about 10%, about 15%, and about 20% of the total thickness of multi-layer film 10. It is within the present disclosure for the thickness of second puncture-resistant sub-layer 36 to fall within one of many different ranges. In a set of ranges, the thickness range of second puncture-resistant sub-layer 36 is one of the following ranges: about 3% to about 20%, about 5% to about 20%, about 5% to about 15%, about 5% to about 13%, and about 6% to about 12% of the total thickness multi-layer film 10. In an example, second puncture-resistant sub-layer 36 may be about 8% of the total thickness of multi-layer film 10.

In an embodiment, second puncture-resistant sub-layer 36 is about 0.1 mils to about 0.5 mils thick. Second puncture-resistant sub-layer 36 may be a particular thickness or fall within one of several different ranges. The thickness of second puncture-resistant sub-layer 36 may be one of the following values: about 0.1 mils, about 0.2 mils, about 0.23 mils, about 0.24 mils, about 0.25 mils, about 0.26 mils, about 0.27 mils, about 0.28 mils, about 0.3 mils, about 0.32 mils, about 0.34 mils, about 0.35 mils, about 0.4 mils, and about 0.5 mils. The thickness of second puncture-resistant sub-layer 36 may fall within one of many different ranges. In a set of ranges, the thickness of second puncture-resistant sub-layer 36 is one of the following ranges: about 0.1 mils to about 0.5 mils, about 0.1 mils to about 0.4 mils, about 0.2 mils to about 0.4 mils, about 0.2 mils to about 0.35 mils, and about 0.2 mils to about 0.3 mils. In an embodiment, second puncture-resistant sub-layer 36 is about 0.26 mils thick.

Third puncture-resistant sub-layer 38 extends between and interconnects second puncture-resistant sub-layer 36 and skin layer 12, as shown in FIGS. 1 and 2. In an embodiment, third puncture-resistant sub-layer 38 comprises a polypropylene material. In another embodiment, the polypropylene material has a melt index of about 0.8. In yet another embodiment, the polypropylene material is a polypropylene copolymer material. In another embodiment, the polypropylene material is a polypropylene impact copolymer. In another embodiment, the polypropylene impact copolymer is a Total Petrochemicals Polypropylene 4170 available from Total Petrochemicals USA, Inc. Total Petrochemicals Polypropylene 4170 has a melt flow of 0.75 g/10 min. according to ASTM Method D-1238 230° C.

In an embodiment, third puncture-resistant sub-layer 38 is about 5% to about 20% of the thickness of multi-layer film 10. Third puncture-resistant sub-layer 38 may be one of several different percentages of thickness of multi-layer film 10 or fall within one of several different ranges. The percentage thickness of third puncture-resistant sub-layer 38 may be one of the following values: about 5%, about 8%, about 9%, about 10%, about 11%, about 12%, about 15%, and about 20% of the total thickness of multi-layer film 10. The percentage thickness of first puncture-resistant sub-layer 34 of multi-layer film 10 may fall within one of many different ranges. In a set of ranges, the thickness range of third puncture-resistant sub-layer 38 is one of the following ranges: about 5% to about 15%, about 5% to about 15%, about 5% to about 13%, about 7% to about 13%, and about 8% to about 12% of the total thickness multi-layer film 10. In an example, third puncture-resistant sub-layer 38 may be about 10% of the overall thickness of multi-layer film 10.

In an embodiment, third puncture-resistant sub-layer 38 is about 0.2 mils to about 0.6 mils thick. Third puncture-resistant sub-layer 38 may be a particular thickness or fall within one of several different ranges. The thickness of third puncture-resistant sub-layer 38 may be one of the following values: about 0.2 mils, about 0.25 mils, about 0.29 mils, about 0.3 mils, about 0.31 mils, about 0.315 mils, about 0.32 mils, about 0.321 mils, about 0.322 mils, about 0.323 mils, about 0.324 mils, about 0.325 mils, about 0.326 mils, about 0.327 mils, about 0.328 mils, about 0.329 mils, about 0.33 mils, about 0.35 mils, about 0.4 mils and about 0.5 mils. The thickness of third puncture-resistant sub-layer 38 may fall within one of many different ranges. In a set of ranges, the thickness of third puncture-resistant sub-layer 38 is one of the following ranges: about 0.2 mils to about 0.6 mils, about 0.2 mils to about 0.5 mils, about 0.3 mils to about 0.5 mils, about 0.3 mils to about 0.45 mils, and about 0.3 mils to about 0.4 mils. In an embodiment, third puncture-resistant sub-layer 38 is about 0.325 mils thick.

In another embodiment, a multi-layer film 110 within the scope of the present disclosure includes a skin layer 112, a seal layer 114, and a puncture-resistant layer 116, as shown in FIG. 3. Skin layer 112 is located in spaced-apart relation to seal layer 114. Puncture-resistant layer 116 extends between and interconnects skin layer 112 and seal layer 114.

In an embodiment, multi-layer film 110 is about 2.5 mils to about 3.5 mils thick. Multi-layer film 110 may be a particular thickness or fall within one of several different ranges. The thickness of multi-layer film 110 may be one of the following values: about 2.5 mils, about 2.6 mils, about 2.7 mils, about 2.8 mils, about 2.9 mils, about 3 mils, about 3.1 mils, about 3.2 mils, about 3.25 mils, about 3.3 mils, about 3.4 mils, and about 3.5 mils. The thickness of multi-layer film 110 may fall within one of many different ranges. In a set of ranges, the thickness of multi-layer film 110 is one of the following ranges: about 2.5 mils to about 3.5 mils, about 2.7 mils to about 3.5 mils, about 2.9 mils to about 3.5 mils, about 3 mils to about 3.5 mils, and about 3 mils to about 3.4 mils. In an embodiment, multi-layer film 110 is about 3.25 mils thick.

Skin layer 112 includes a first skin sub-layer 118, a second skin sub-layer 120, and a third skin sub-layer 121 as shown in FIG. 3. First skin sub-layer 118 is configured to extend between and interconnect second skin sub-layer 120 with puncture-resistant layer 116. Second skin sub-layer 120 is configured to extend between and interconnect first skin sub-layer 118 with third skin sub-layer 121.

In an embodiment, skin layer 112 is about 30% to about 60% of the overall thickness of multi-layer film 110. Skin layer 112 may be one of several different percentages of thickness of multi-layer film 110 or fall within one of several different ranges. The percentage thickness of skin layer 112 may be one of the following values: about 30%, about 35%, about 40%, about 41%, about 42%, about 43%, about 44%, about 45%, about 50%, about 55%, and about 60% of the total thickness of multi-layer film 110. The percentage thickness of skin layer 112 may fall within one of many different ranges. In a set of ranges, the thickness of skin layer 112 is one of the following ranges: about 30% to about 60%, about 35% to about 60%, about 40% to about 60%, about 40% to about 55%, and about 40% to about 50% of the total thickness of multi-layer film 110. In an embodiment, skin layer 112 is about 42% of the total thickness of multi-layer film 110.

In an embodiment, skin layer 112 is about 0.9 mils to about 1.9 mils thick. Skin layer 112 may be a particular thickness or fall within one of several different ranges. The thickness of skin layer 112 may be one of the following values: about 0.9 mils, about 1 mil, about 1.1 mils, about 1.2 mils, about 1.3 mils, about 1.4 mils, about 1.5 mils, about 1.6 mils, about 1.7 mils, about 1.8 mils, and about 1.9 mils. The thickness of skin layer 112 may fall within one of many different ranges. In a set of ranges, the thickness of skin layer 112 is one of the following ranges: about 0.9 mils to about 1.8 mils, about 0.9 mils to about 1.6 mils, about 1 mil to about 1.6 mils, about 1.2 mils to about 1.6 mils, and about 1.3 mils to about 1.6 mils. In an embodiment, skin layer 112 is about 1.4 mils thick.

First skin sub-layer 118 extends between and interconnects second skin sub-layer 120 and puncture-resistant layer 116, as shown in FIG. 3. Illustratively, first skin sub-layer 118 may be similar to first skin sub-layer 18. In an embodiment, first skin sub-layer 118 comprises an LLDPE material. In another embodiment, the LLDPE material has a melt flow index of about 1.0. In another embodiment, the LLDPE material is a metallocene modified LLDPE (mLLDPE). In yet another embodiment, the mLLDPE material is Exxon-Mobil® Exceed™ 1018HA.

In an embodiment, first skin sub-layer 118 is about 5% to about 20% of the total thickness of multi-layer film 110. First skin sub-layer 118 may be one of several different percentages of the total thickness of multi-layer film 110 or fall within one of several different ranges. The percentage thickness of first skin sub-layer 118 may be one of the following values: about 5%, about 6%, about 7%, about 8%, about 9%, about 10%, about 11%, about 15%, and about 20% of the total thickness of multi-layer film 110. The percentage thickness of first skin sub-layer 118 may fall within one of many different ranges. In a set of ranges, the percentage thickness range of first skin sub-layer 118 is one of the following ranges: about 5% to 20%, about 5% to about 15%, about 5% to about 13%, and about 6% to about 12% of the total thickness multi-layer film 110. In an example, first skin sub-layer 118 may be about 9% of the total thickness of multi-layer film 110.

In an embodiment, first skin sub-layer 118 is about 0.1 mils to about 0.5 mils thick. First skin sub-layer 118 may be a particular thickness or fall within one of several different ranges. The thickness of first skin sub-layer 118 may be one of the following values: about 0.1 mils, about 0.2 mils, about 0.25 mils, about 0.28 mils, about 0.29 mils, about 0.291 mils, about 0.292 mils, about 0.293 mils, about 0.294 mils, about 0.295 mils, about 0.3 mils, about 0.31 mils, about 0.33 mils, about 0.35 mils, about 0.4 mils, and about 0.5 mils. The thickness of first skin sub-layer 118 may fall within one of many different ranges. In a set of ranges, the thickness of first skin sub-layer 118 is one of the following ranges: about 0.1 mils to about 0.5 mils, about 0.1 mils to about 0.4 mils, about 0.2 mils to about 0.4 mils, about 0.2 mils to about 0.35 mils, and about 0.2 mils to about 0.3 mils. In an embodiment, first skin sub-layer 118 is about 0.293 mils thick.

Second skin sub-layer 120 extends between and interconnects first skin sub-layer 118 and third skin sub-layer 121, as shown in FIG. 3. Illustratively, second skin sub-layer 120 may be a tie-layer or optionally provide anti-curl properties.

In an embodiment, second skin sub-layer 120 is about 5% to about 30% multi-layer film 110. Second skin sub-layer 120 may be one of several different percentages of thickness of multi-layer film 110 or fall within one of several different ranges. The percentage thickness of second skin sub-layer 120 may be one of the following values: about 5%, about 10%, about 13%, about 14%, about 15%, about 16%, about 17%, about 18%, about 20%, about 25%, and about 30% of the total thickness of multi-layer film 110. The percentage thickness of second skin sub-layer 120 may fall within one of many different ranges. In a set of ranges, the percentage thickness range of second skin sub-layer 120 is one of the following ranges: about 5% to about 30%, about 5% to about 25%, about 10% to about 25%, about 10% to about 20%, and about 11% to about 19% of the total thickness multi-layer film 110. In an example, second skin sub-layer 120 may be about 15% of the overall thickness of multi-layer film 110.

In an embodiment, second skin sub-layer 120 is about 0.2 mils to about 0.8 mils thick. Second skin sub-layer 120 may be a particular thickness or fall within one of several different ranges. The thickness of second skin sub-layer 120 may be one of the following values: about 0.2 mils, about 0.35 mils, about 0.4 mils, about 0.45 mils, about 0.46 mils, about 0.47 mils, about 0.48 mils, about 0.485 mils, about 0.486 mils, about 0.487 mils, about 0.488 mils, about 0.489 mils, about 0.49 mils, about 0.491 mils, about 0.495 mils, about 0.5 mils, about 0.6 mils, about 0.7 mils, and about 0.8 mils thick. The thickness of second skin sub-layer 120 may fall within one of many different ranges. In a set of ranges, the thickness of second skin sub-layer 120 is one of the following ranges: about 0.2 mils to about 0.8 mils, about 0.2 mils to about 0.7 mils, about 0.3 mils to about 0.7 mils, about 0.4 mils to about 0.7 mils, and about 0.4 mils to about 0.6 mils. In an embodiment, second skin sub-layer 120 is about 0.488 mils thick.

In an embodiment, second seal sub-layer 120 comprises an HDPE material. In another embodiment, the HDPE material has a melt flow index of about 1.2. In an embodiment, the HDPE material is Nova Chemicals® SURPASS® HPs167-AB.

Third skin sub-layer 121 is located in spaced-apart relation to second skin sub-layer 120 as shown in FIG. 3. In an embodiment, third skin sub-layer 121 may form the exterior surface 22 when multi-layer film 110 forms a package 24.

In an embodiment, third skin sub-layer 121 is about 5% to about 30% of the total thickness of multi-layer film 110. Third skin sub-layer 121 may be one of several different percentages of the total thickness of multi-layer film 110 or fall within one of several different ranges. The percentage thickness of third skin sub-layer 121 may be one of the following values: about 5%, about 10%, about 15%, about 16%, about 17%, about 18%, about 19%, about 20%, about 25%, and about 30% of the total thickness multi-layer film 110. The percentage thickness of third skin sub-layer 121 may fall within one of many different ranges. In a set of ranges, the thickness range of second skin sub-layer 120 is one of the following ranges: about 5% to about 30%, about 10% to about 30%, about 10% to about 25%, about 15% to about 25%, and about 15% to about 20%, of the total thickness multi-layer film 110. In an example, third skin sub-layer 121 may be about 18% of the overall thickness multi-layer film 110.

In an embodiment, third skin sub-layer 121 is about 0.3 mils to about 0.8 mils thick. Third skin sub-layer 121 may be a particular thickness or fall within one of several different ranges. The thickness of third skin sub-layer 121 may be one of the following values: about 0.3 mils, about 0.35 mils, about 0.4 mils, about 0.45 mils, about 0.5 mils, about 0.55 mils, about 0.56 mils, about 0.57 mils, about 0.58 mils, about 0.583 mils, about 0.584 mils, about 0.585 mils, about 0.586 mils, about 0.587 mils, about 0.59 mils, about 0.6 mils, and about 0.8 mils. The thickness of third skin sub-layer 121 may fall within one of many different ranges. In a set of ranges, the thickness of third skin sub-layer 121 is one of the following ranges: about 0.3 mils to about 0.8 mils, about 0.2 mils to about 0.7 mils, about 0.3 mils to about 0.7 mils, about 0.4 mils to about 0.7 mils, and about 0.5 mils to about 0.65 mils. In an embodiment, third skin sub-layer 121 is about 0.585 mils thick.

In an embodiment, third skin sub-layer 121 comprises an HDPE material. In another embodiment, the HDPE material has a melt flow index of about 0.9. In yet another embodiment, the HDPE material is Dow® Elite™ 5960G. In an example, third skin sub-layer 121 further comprises an mLLDPE material. In an embodiment, the mLLDPE resin has a melt flow index of about 1.0. In another embodiment, the mLLDPE is ExxonMobil® Exceed™ 1018HA. In an example, third skin sub-layer 121 comprises a blend of Dow® Elite™ 5960G and ExxonMobil® Exceed™ 1018HA.

In an embodiment, third skin sub-layer 121 comprises a blend of an HDPE material and an mLLDPE material. Third skin sub-layer 121 may comprise a percentage of an HDPE material and a percentage of an mLLDPE material. Third skin sub-layer 121 may be one of several different percentages of an HDPE material or fall within one of several different ranges. The percentage by weight of an HDPE material for third skin sub-layer 121 may be selected from the following values: about 70%, about 75%, about 80%, about 85%, about 90%, about 92%, about 93%, about 94%, about 95%, about 96%, and about 97%. The percentage by weight of an mLLDPE material for third skin sub-layer 121 may be selected from the following values: about 30%, about 25%, about 20%, about 15%, about 10%, about 8%, about 7%, about 6%, about 5%, about 4%, and about 3%. In an example, third skin sub-layer 121 comprises a blend of about 95% of an HDPE material and about 5% of an mLLDPE material. In an exemplary embodiment, third skin sub-layer 121 comprises a blend of about 95% Dow® Elite™ 5960G and about 5% ExxonMobil® Exceed™ 1018HA.

Seal layer 114 includes a first seal sub-layer 126, a second seal sub-layer 128, and a third seal sub-layer 129 as shown in FIG. 3. Second seal sub-layer 128 is configured to extend between and interconnect first seal sub-layer 126 with third seal sub-layer 129. Third seal sub-layer 129 is configured to extend between and interconnect second seal sub-layer 128 and puncture-resistant layer 116. In an embodiment, first seal sub-layer 126 may form interior surface 30 when multi-layer film 110 is used to form package 24.

In an embodiment, seal layer 114 is about 15% to about 45% of total thickness of multi-layer film 110. Seal layer 114 may be one of several different percentages of thickness of multi-layer film 110 or fall within one of several different ranges. The percentage thickness of seal layer 114 may be one of the following values: about 15%, about 20%, about 25%, about 30%, about 31%, about 32%, about 33%, about 34%, about 35%, about 40%, and about 45% of the total thickness of multi-layer film 110. The percentage thickness of seal layer 114 may fall within one of many different ranges. In a set of ranges, the thickness range of seal layer 114 is one of the following ranges: about 15% to about 45%, about 15% to about 40%, about 20% to about 40%, about 25% to about 40%, about 25% to about 35%, and about 26% to about 34% of the total thickness of multi-layer film 110. In an embodiment, seal layer 114 is about 31% of the total thickness of multi-layer film 110.

In an embodiment, seal layer 114 is about 0.5 mils to about 1.5 mils thick. Seal layer 114 may be a particular thickness or fall within one of several different ranges. The thickness of seal layer 114 may be one of the following values: about 0.5 mils, about 0.6 mils, about 0.7 mils, about 0.8 mils, about 0.9 mils, about 1 mil, about 1.1 mils, about 1.2 mils, about 1.3 mils, about 1.4 mils, and about 1.5 mils. The thickness of seal layer 114 may fall within one of many different ranges. In a set of ranges, the thickness of seal layer 114 is one of the following ranges: about 0.5 mils to about 1.5 mils, about 0.5 mils to about 1.4 mils, about 0.6 mils to about 1.4 mils, about 0.7 mils to about 1.4 mils, and about 0.7 mils to about 1.2 mils. In an embodiment, seal layer 114 is about 1 mil thick.

First seal sub-layer 126 is located in spaced-apart relation to second seal sub-layer 128 as shown in FIG. 3. In an embodiment, first seal sub-layer 126 may form interior surface 30 if multi-layer film 110 is used to form package 24. Illustratively, first seal sub-layer 126 is the surface that contacts food product 42 in interior product-storage region 32.

In an embodiment, first seal sub-layer 126 is about 5% to about 20% of the total thickness of multi-layer film 110. First seal sub-layer 126 may be one of several different percentages of thickness of multi-layer film 110 or fall within one of several different ranges. The percentage thickness of first seal sub-layer 126 may be one of the following values: about 5%, about 8%, about 9%, about 10%, about 11%, about 12%, about 13%, about 14%, about 15%, and about 20% of the total thickness of multi-layer film 110. The percentage thickness of first seal sub-layer 126 may fall within one of many different ranges. In a set of ranges, the thickness range of first seal sub-layer 126 may be one of the following ranges: about 5% to about 20%, about 5% to about 18%, about 5% to about 15%, about 8% to about 15%, about 8% to about 13%, and about 10% to about 13% of the total thickness multi-layer film 110. In an example, first seal sub-layer 126 may be about 12% of the overall thickness of multi-layer film 110.

In an embodiment, first seal sub-layer 126 is about 0.2 mils to about 0.8 mils thick. First seal sub-layer 126 may be a particular thickness or fall within one of several different ranges. The thickness of first seal sub-layer 126 may be one of the following values: about 0.2 mils, about 0.25 mils, about 0.3 mils, about 0.35 mils, about 0.37 mils, about 0.38 mils, about 0.39 mils, about 0.4 mils, about 0.41 mils, about 0.42 mils, about 0.45 mils, about 0.5 mils, about 0.6 mils, and about 0.8 mils. The thickness of first seal sub-layer 126 may fall within one of many different ranges. In a set of ranges, the thickness of first seal sub-layer 126 is one of the following ranges: about 0.2 mils to about 0.8 mils, about 0.2 mils to about 0.6 mils, about 0.2 mils to about 0.5 mils, about 0.2 mils to about 0.45 mils, and about 0.35 mils to about 0.45 mils. In an embodiment, first seal sub-layer 126 is about 0.39 mils thick.

In an embodiment, first seal sub-layer 126 comprises an ionomer material. In an embodiment, the ionomer material may be a Zn ionomer material. In another embodiment, the Zn ionomer material has a melt flow index of about 1.4. In another example, first seal sub-layer 126 further comprises a second ionomer material. In an embodiment, the second ionomer material may be a Na ionomer material. In an embodiment, the second ionomer material has a melt flow index of about 1.3. In yet another embodiment, the first seal sub-layer comprises a blend of DuPont™ Surlyn® 1825 and DuPont™ Surlyn® 1601-2.

In an embodiment, first seal sub-layer 126 may comprise a Zn ionomer material and a Na ionomer material. The percentage amount of the Zn ionomer material in the first seal sub-layer formulation may be one of the following values: about 50%, about 55%, about 60%, about 65%, about 70%, or about 75% by weight of the formulation of first seal sub-layer 126. The percentage of Zn ionomer material of the first seal layer formulation may fall within one of many different ranges. In a set of ranges, the percentage of the Zn ionomer material of the first seal layer formulation is one of the following ranges: about 30% to about 80%, about 40% to about 80%, about 50% to about 80%, about 55% to about 80%, about 55% to about 70%, and about 65% to about 70% of the total by weight percentage of the first seal sub-layer formulation. The percentage amount of the Na ionomer material in the first seal sub-layer formulation may be one of the following values: about 45%, about 40%, about 35%, about 30%, about 25%, about 20%, and about 15% by weight of the formulation of first seal sub-layer 26. In certain embodiments, the Na ionomer material of the first seal layer formulation may fall within one of many different ranges. In a set of ranges, the percentage of the Na ionomer material of the first seal layer formulation is one of the following ranges: about 15% to about 45%, about 15% to about 40%, about 15% to about 35%, about 20% to about 35%, about 20% to about 30%, and about 21% to about 28% of the total by weight percentage of the first seal sub-layer formulation. In an exemplary embodiment, first seal sub-layer 126 comprises about 67.5% of the Zn ionomer material and about 25% of the Na ionomer material. In another exemplary embodiment, first seal sub-layer 126 comprises about 67.5% DuPont™ Surlyn® 1825 and about 25% DuPont™ Surlyn® 1601-2.

In an embodiment, first seal sub-layer 126 may optionally include one or more process additives such as slip agents or anti-block agents. In an embodiment, first seal sub-layer 126 includes a slip agent and an anti-block agent. Illustratively, the slip agent may be an amide type slip agent. In an embodiment, the slip agent may be DuPont™ Conpol® 20S1. It is within the scope of the present disclosure for the percentage by weight of the slip agent to fall within a set of ranges including about 1% to about 10%, about 2% to about 10%, about 3% to about 10%, and about 3% to about 5%. Illustratively, the anti-block agent may be talc. In an embodiment, the anti-block agent may be talc in ethyl methyl acrylate (EMA). In another embodiment, the anti-block agent may be ABC5000PBMA available from the Polyfil Corporation. It is within the scope of the present disclosure for the percentage by weight of the anti-block agent to fall within a set of ranges including about 1% to about 10%, about 2% to about 10%, about 3% to about 10%, and about 3% to about 5%.

In an exemplary embodiment, first seal sub-layer 126 may comprise a combination of a Zn ionomer material, a Na ionomer material, a slip agent, and an anti-block agent. In an embodiment, first seal sub-layer 126 may comprise about 67.5% Zn ionomer, about 25% Na ionomer, about 4% slip agent, and about 3.5% anti-block agent. In yet another embodiment, first seal sub-layer 126 may comprise about 67.5% DuPont™ Surlyn® 1825, about 25% DuPont™ Surlyn® 1601-2, about 4% DuPont™ Conpol® 20S1, and about 3.5% Polyfil ABC5000PBMA.

Second seal sub-layer 128 extends between and interconnects first seal sub-layer 126 and third seal sub-layer 129, as shown in FIG. 3. Illustratively, second seal sub-layer 128 may be a tie-layer, or optionally may provide anti-curl properties.

In embodiment, second seal sub-layer 128 is about 5% to about 30% multi-layer film 110. Second seal sub-layer 128 may be one of several different percentages of thickness of multi-layer film 110 or fall within one of several different ranges. The percentage thickness of second seal sub-layer 128 may be one of the following values: about 5%, about 10%, about 13%, about 14%, about 15%, about 16%, about 17%, about 18%, about 20%, about 25%, and about 30% of the total thickness of multi-layer film 110. The percentage thickness of second seal sub-layer 128 may fall within one of many different ranges. In a set of ranges, the thickness range of second seal sub-layer 128 is one of the following ranges: about 5% to about 30%, about 5% to about 25%, about 10% to about 25%, about 10% to about 20%, and about 11% to about 19% of the total thickness multi-layer film 110. In an example, second seal sub-layer 128 may be about 15% of the overall thickness of multi-layer film 110.

In an embodiment, second seal sub-layer 128 is about 0.2 mils to about 0.8 mils thick. Second seal sub-layer 128 may be a particular thickness or fall within one of several different ranges. The thickness of second seal sub-layer 128 may be one of the following values: about 0.2 mils, about 0.25 mils, about 0.3 mils, about 0.35 mils, about 0.37 mils, about 0.38 mils, about 0.39 mils, about 0.4 mils, about 0.41 mils, about 0.42 mils, about 0.45 mils, about 0.5 mils, about 0.6 mils, and about 0.8 mils. The thickness of second seal sub-layer 128 may fall within one of many different ranges. In a set of ranges, the thickness of second seal sub-layer 128 is one of the following ranges: about 0.2 mils to about 0.8 mils, about 0.2 mils to about 0.6 mils, about 0.2 mils to about 0.5 mils, about 0.2 mils to about 0.45 mils, and about 0.35 mils to about 0.45 mils. In an embodiment, second seal sub-layer 128 is about 0.39 mils thick.

In an embodiment, second seal sub-layer 128 comprises an HDPE material. In another embodiment, the HDPE material has a melt flow index of about 1.2. In an embodiment, the HDPE material is Nova Chemicals® SURPASS® HPs167-AB.

Third seal sub-layer 129 extends between and interconnects second seal sub-layer 128 and puncture-resistant layer 116, as shown in FIG. 3. Illustratively, third seal sub-layer 129 may be a tie-layer or may provide anti-curl properties.

In another embodiment, third seal sub-layer 129 is about 3% to about 20% of the total thickness of multi-layer film 110. Third seal sub-layer 129 may be one of several different percentages of thickness of multi-layer film 110 or fall within one of several different ranges. The percentage thickness of third seal sub-layer 129 may be one of the following values: about 3%, about 4% about 5%, about 6%, about 7%, about 8%, about 9%, about 10%, about 15%, and about 20% of the total thickness of multi-layer film 110. The percentage thickness of third seal sub-layer 129 may fall within one of many different ranges. In a set of ranges, the thickness range of third seal sub-layer 129 is one of the following ranges: about 3% to about 20%, about 5% to about 20%, about 5% to about 15%, and about 5% to about 10% of the total thickness multi-layer film 110. In an example, third seal sub-layer 129 may be about 7% of the overall thickness of multi-layer film 110.

In an embodiment, third seal sub-layer 129 is about 0.1 mils to about 0.5 mils thick. Third seal sub-layer 129 may be a particular thickness or fall within one of several different ranges. The thickness of third seal sub-layer 129 may be one of the following values: about 0.1 mils, about 0.2 mils, about 0.21 mils, about 0.215 mils, about 0.22 mils, about 0.225 mils, about 0.226 mils, about 0.227 mils, about 0.228 mils, about 0.229 mils, about 0.23 mils, about 0.231 mils, about 0.25 mils, about 0.3 mils, about 0.4 mils and about 0.5 mils. The thickness of third seal sub-layer 129 may fall within one of many different ranges. In a set of ranges, the thickness of third seal sub-layer 129 is one of the following ranges: about 0.1 mils to about 0.5 mils, about 0.1 mils to about 0.4 mils, about 0.2 mils to about 0.4 mils, about 0.2 mils to about 0.35 mils, and about 0.2 mils to about 0.3 mils. In an embodiment, third seal sub-layer 129 is about 0.228 mils thick.

In an embodiment, third seal sub-layer 129 comprises an mLLDPE material. In an embodiment, the mLLDPE material has a melt flow index of about 1.0. In an embodiment, the mLLDPE material is ExxonMobil® Exceed™ 1018HA. In an example, third seal sub-layer 129 further comprises a modified LLDPE material. In an embodiment, the modified LLDPE resin has a melt flow index of about 2.7. In another embodiment, the modified LLDPE is DuPont™ Bynel® 41E710. In an example, third seal sub-layer 129 comprises a combination of ExxonMobil® Exceed™ 1018HA and DuPont™ Bynel® 41E710.

It is within the scope of the present disclosure for third seal sub-layer 129 to comprise of a percentage by weight of an mLLDPE material and a percentage by weight of an LLDPE material. Third seal sub-layer 129 may be one of several different percentages of an mLLDPE material or fall within one of several different ranges. The percentage by weight of an mLLDPE material for third seal sub-layer 129 may be selected from the following values: about 60%, about 65%, about 70%, about 75%, about 80%, about 85%, and about 90%. The amount of the HDPE material may fall within a series of ranges including about 60% to about 90%, about 65% to about 90%, about 70% to about 90%, about 75% to about 90%, about 80% to about 90%, and about 82% to about 88% by weight of third seal sub-layer 129. The percentage by weight of an LLDPE material for third seal sub-layer 129 may be selected from the following values: about 30%, about 25%, about 20%, about 15%, about 10%, and about 5% by weight of second seal sub-layer 28. The amount of the LLDPE material may fall within a series of ranges including about 5% to about 30%, about 5% to about 25%, about 10% to about 25%, about 10% to about 20%, and about 12% to about 18% by weight of third seal sub-layer 129. In an example, third seal sub-layer 129 comprises about 85% of an mLLDPE material and about 15% of an LLDPE material. In another embodiment, third seal sub-layer 129 comprises about 85% ExxonMobil® Exceed™ 1018HA and about 15% DuPont™ Bynel® 41E710.

Puncture-resistant layer 116 includes a first puncture-resistant sub-layer 134, a second puncture-resistant sub-layer 136, and a third puncture-resistant sub-layer 138 as shown in FIG. 3. First puncture-resistant sub-layer 134 is configured to extend between and interconnect seal layer 114 with second puncture-resistant sub-layer 136. Second puncture-resistant sub-layer 136 is configured to extend between and interconnect first puncture-resistant sub-layer 134 and third puncture-resistant sub-layer 138. Third puncture-resistant sub-layer 138 is configured to extend between and interconnect second puncture-resistant sub-layer 136 and skin layer 112.

In another embodiment, puncture-resistant layer 116 is about 15% to about 40% of the total thickness of multi-layer film 110. Puncture-resistant layer 116 may be one of several different percentages of thickness of multi-layer film 110 or fall within one of several different ranges. The percentage thickness of puncture-resistant layer 116 may be one of the following values: about 15%, about 20%, about 25%, about 26%, about 27%, about 28%, about 29%, about 30%, about 35%, and about 40% of the total thickness of multi-layer film 110. The percentage thickness of puncture-resistant layer 116 may fall within one of many different ranges. In a set of ranges, the thickness range of puncture-resistant layer 116 is one of the following ranges: about 15% to about 40%, about 20% to about 40%, about 20% to about 35%, about 25% to about 35%, and about 25% to about 30% of the total thickness of multi-layer film 110. In an embodiment, puncture-resistant layer 116 is about 27% of the total thickness of multi-layer film 110.

In an embodiment, puncture-resistant layer 116 is about 0.5 mils to about 1.5 mils thick. Puncture-resistant layer 116 may be a particular thickness or fall within one of several different ranges. The thickness of puncture-resistant layer 116 may be one of the following values: about 0.5 mils, about 0.6 mils, about 0.7 mils, about 0.8 mils, about 0.9 mils, about 1 mil, about 1.1 mils, about 1.2 mils, about 1.3 mils, about 1.4 mils, and about 1.5 mils. The thickness of puncture-resistant layer 116 may fall within one of many different ranges. In a set of ranges, the thickness of puncture-resistant layer 116 is one of the following ranges: about 0.5 mils to about 1.5 mils, about 0.5 mils to about 1.4 mils, about 0.6 mils to about 1.4 mils, about 0.7 mils to about 1.4 mils, and about 0.7 mils to about 1.2 mils. In an embodiment, puncture-resistant layer 116 is about 0.9 mils thick.

First puncture-resistant sub-layer 134 extends between and interconnects second puncture-resistant sub-layer 136 and seal layer 114, as shown in FIG. 3.

In an embodiment, first puncture-resistant sub-layer 134 is about 5% to about 20% of the thickness of multi-layer film 110. First puncture-resistant sub-layer 134 may be one of several different percentages of thickness of multi-layer film 110 or fall within one of several different ranges. The percentage thickness of first puncture-resistant sub-layer 34 may be one of the following values: about 5%, about 6%, about 7% about, 8%, about 9%, about 10%, about 11%, about 12%, about 13%, about 14%, about 15%, and about 20% of the total thickness of multi-layer film 110. The percentage thickness of first puncture-resistant sub-layer 134 may fall within one of many different ranges. In a set of ranges, the thickness range of first puncture-resistant sub-layer 134 is one of the following ranges: about 5% to about 20%, about 5% to about 15%, about 5% to about 13%, and about 7% to about 13%, of the total thickness multi-layer film 110. In an example, first puncture-resistant sub-layer 134 may be about 10% of the overall thickness of multi-layer film 110.

In an embodiment, first puncture-resistant sub-layer 134 is about 0.2 mils to about 0.6 mils thick. First puncture-resistant sub-layer 134 may be a particular thickness or fall within one of several different ranges. The thickness of first puncture-resistant sub-layer 134 may be one of the following values: about 0.2 mils, about 0.25 mils, about 0.29 mils, about 0.3 mils, about 0.31 mils, about 0.315 mils, about 0.32 mils, about 0.321 mils, about 0.322 mils, about 0.323 mils, about 0.324 mils, about 0.325 mils, about 0.326 mils, about 0.327 mils, about 0.328 mils, about 0.329 mils, about 0.33 mils, about 0.35 mils, about 0.4 mils and about 0.5 mils. The thickness of first puncture-resistant sub-layer 134 may fall within one of many different ranges. In a set of ranges, the thickness first puncture-resistant sub-layer 134 is one of the following ranges: about 0.2 mils to about 0.6 mils, about 0.2 mils to about 0.5 mils, about 0.3 mils to about 0.5 mils, about 0.3 mils to about 0.45 mils, and about 0.3 mils to about 0.4 mils. In an embodiment, first puncture-resistant sub-layer 134 is about 0.325 mils thick.

In an embodiment, first puncture-resistant sub-layer 134 comprises a nylon material. In another embodiment, the nylon material has a relative viscosity between 3.19 and 3.41 as measured by ISO 307. In yet another embodiment, the nylon material is a lubricated copolyamide 6/66 grade material. In an embodiment, the nylon material is BASF® Ultramid® C33 L.

Second puncture-resistant sub-layer 136 is configured to extend between and interconnect first puncture-resistant sub-layer 134 and third puncture-resistant sub-layer 138, as shown in FIG. 3. Illustratively, second puncture-resistant sub-layer 136 may serve as a tie-layer.

In another embodiment, second puncture-resistant sub-layer 136 is about 3% to about 20% of the total thickness of multi-layer film 110. Second puncture-resistant sub-layer 136 may be one of several different percentages of thickness of multi-layer film 110 or fall within one of several different ranges. The percentage thickness of second puncture-resistant sub-layer 136 may be one of the following values: about 3%, about 4% about 5%, about 6%, about 7%, about 8%, about 9%, about 10%, about 15%, and about 20% of the total thickness of multi-layer film 110. The percentage thickness of second puncture-resistant sub-layer 136 may fall within one of many different ranges. In a set of ranges, the thickness range of second puncture-resistant sub-layer 136 is one of the following ranges: about 3% to about 20%, about 5% to about 20%, about 5% to about 15%, and about 5% to about 10% of the total thickness multi-layer film 110. In an example, second puncture-resistant sub-layer 136 may be about 7% of the overall thickness of multi-layer film 110.

In an embodiment, second puncture-resistant sub-layer 136 is about 0.1 mils to about 0.5 mils thick. Second puncture-resistant sub-layer 136 may be a particular thickness or fall within one of several different ranges. The thickness of second puncture-resistant sub-layer 136 may be one of the following values: about 0.1 mils, about 0.2 mils, about 0.21 mils, about 0.215 mils, about 0.22 mils, about 0.225 mils, about 0.226 mils, about 0.227 mils, about 0.228 mils, about 0.229 mils, about 0.23 mils, about 0.231 mils, about 0.25 mils, about 0.3 mils, about 0.4 mils and about 0.5 mils. The thickness of second puncture-resistant sub-layer 136 may fall within one of many different ranges. In a set of ranges, the thickness of second puncture-resistant sub-layer 136 is one of the following ranges: about 0.1 mils to about 0.5 mils, about 0.1 mils to about 0.4 mils, about 0.2 mils to about 0.4 mils, about 0.2 mils to about 0.35 mils, and about 0.2 mils to about 0.3 mils. In an embodiment, third seal sub-layer 129 is about 0.228 mils thick.

In an embodiment, second puncture-resistant sub-layer 136 comprises an LLDPE material. In an embodiment, the LLDPE material has a melt flow index of about 1.0. In another embodiment, the LLDPE material is a metallocene modified LLDPE (mLLDPE). In an embodiment, the mLLDPE material is ExxonMobil® Exceed™ 1018HA. In an example, second puncture-resistant sub-layer 136 further comprises a modified LLDPE material. In an embodiment, the modified LLDPE material may act as an adhesive. In an embodiment, the modified LLDPE resin has a melt flow index of about 2.7. In another embodiment, the modified LLDPE is DuPont™ Bynel® 41E710. In an example, second puncture-resistant sub-layer 136 comprises a combination of ExxonMobil® Exceed™ 1018HA and DuPont™ Bynel® 41E710.

In an embodiment, second puncture-resistant sub-layer 136 comprises a combination of an mLLDPE material and a modified LLDPE material. Second puncture-resistant sub-layer 136 may comprise a percentage by weight of an mLLDPE material, and the remainder of second puncture-resistant sub-layer 136 may comprise a percentage of a modified LLDPE material. Second puncture-resistant sub-layer 136 may be one of several different percentages of an mLLDPE material or fall within one of several different ranges. The percentage by weight of an mLLDPE material for second puncture-resistant sub-layer 136 from the following values: about 60%, about 65%, about 70%, about 75%, about 80%, about 85%, and about 90%. The percentage by weight of the mLLDPE material may fall within a series of ranges including about 60% to about 90%, about 65% to about 90%, about 70% to about 90%, about 75% to about 90%, about 80% to about 90%, and about 82% to about 88% by weight of second puncture-resistant sub-layer 136. The percentage by weight of a modified LLDPE material for second puncture-resistant sub-layer 136 may be selected from the following values: about 30%, about 25%, about 20%, about 15%, about 10%, and about 5% by weight of second puncture-resistant sub-layer 136. The percentage by weight of the modified LLDPE material may fall within a series of ranges including about 5% to about 30%, about 5% to about 25%, about 10% to about 25%, about 10% to about 20%, and about 12% to about 18% by weight of second puncture-resistant sub-layer 136. In an example, second puncture-resistant sub-layer 136 comprises about 85% of an mLLDPE material and about 15% of a modified LLDPE material. In another example, second puncture-resistant sub-layer 136 comprises about 85% ExxonMobil® Exceed™ 1018HA and about 15% DuPont™ Bynel® 41E710.

Third puncture-resistant sub-layer 138 extends between and interconnects second puncture-resistant sub-layer 136 and skin layer 112, as shown in FIG. 3. In an embodiment, third puncture-resistant sub-layer 138 comprises a polypropylene material. In another embodiment, the polypropylene material has a melt index of about 0.8. In yet another embodiment, the polypropylene material is a polypropylene copolymer material. In an embodiment, the polypropylene material is polypropylene impact copolymer. In another embodiment, the polypropylene impact copolymer is a Total Petrochemicals Polypropylene 4170 available from Total Petrochemicals USA, Inc. Total Petrochemicals Polypropylene 4170 has a melt flow of 0.75 g/10 min. according to ASTM Method D-1238 230° C.

In an embodiment, third puncture-resistant sub-layer 138 is about 5% to about 20% of the thickness of multi-layer film 110. Third puncture-resistant sub-layer 138 may be one of several different percentages of thickness of multi-layer film 110 or fall within one of several different ranges. The percentage thickness of third puncture-resistant sub-layer 138 may be one of the following values: about 5%, about 8%, about 9%, about 10%, about 11%, about 12%, about 15%, and about 20% of the total thickness of multi-layer film 110. The percentage thickness of third puncture-resistant sub-layer 138 may fall within one of many different ranges. In a set of ranges, the thickness range of third puncture-resistant sub-layer 138 is one of the following ranges: about 5% to about 20%, about 5% to about 15%, about 5% to about 13%, about 7% to about 13%, and about 8% to about 12% of the total thickness multi-layer film 110. In an example, third puncture-resistant sub-layer 138 may be about 10% of the overall thickness of multi-layer film 110.

In an embodiment, third puncture-resistant sub-layer 138 is about 0.2 mils to about 0.6 mils thick. Third puncture-resistant sub-layer 138 may be a particular thickness or fall within one of several different ranges. The thickness of third puncture-resistant sub-layer 138 may be one of the following values: about 0.2 mils, about 0.25 mils, about 0.29 mils, about 0.3 mils, about 0.31 mils, about 0.315 mils, about 0.32 mils, about 0.321 mils, about 0.322 mils, about 0.323 mils, about 0.324 mils, about 0.325 mils, about 0.326 mils, about 0.327 mils, about 0.328 mils, about 0.329 mils, about 0.33 mils, about 0.35 mils, about 0.4 mils and about 0.5 mils. The thickness of third puncture-resistant sub-layer 138 may fall within one of many different ranges. In a set of ranges, the thickness third puncture-resistant sub-layer 138 is one of the following ranges: about 0.2 mils to about 0.6 mils, about 0.2 mils to about 0.5 mils, about 0.3 mils to about 0.5 mils, about 0.3 mils to about 0.45 mils, and about 0.3 mils to about 0.4 mils. In an embodiment, third puncture-resistant sub-layer 138 is about 0.325 mils thick.

Multi-layer film 10,110 may be used to form package 24 to store a food product 42. Package 24 includes pouch 44 formed to include interior product-storage region 32, first closure 46 located at a first end 48 of pouch 44, and second closure 50 located on an opposite second end 52 of pouch 44 in spaced-apart relation to first closure 46. When filling pouch 44 with food product 42 at a packing facility, second end 52 may be sealed to form second closure 50 in order to retain food product 42. After filling pouch 44 with food product 42, first end 48 may be sealed to form first closure 46. Multi-layer film 10, 110 may be used to store food product 42 and minimize food product 42 from puncturing multi-layer film 10, 110 of pouch 44 through seal layer 14, 114 to exterior surface 22 in order to keep the contents contained in a sealed environment.

Multi-layer films in accordance with the present disclosure may have various characteristics including average basis weight, average gauge, point to point gauge guideline, haze percent, COF inside tube green, COF inside tube aged, COF outside tube green, COF outside tube aged, heat seal strength, heat seal strength aged, MVTR, and OTR. In one example, average basis weight may be about 44 lbs/ream to about 52 lbs/ream or any suitable value therebetween. In one example, average gauge may be about 3.0 mils to about 3.5 mils or any suitable value therebetween. In one example, point to point gauge guideline may be about 2.6 mils to about 3.9 mils or any suitable value therebetween. In one example, haze percent may be about 30% to about 40% or any suitable value therebetween. In one example, COF inside tube green may be between 0.2 and 0.4 or any suitable value therebetween. In one example, COF inside tube aged may be between 0.2 and 0.4 or any suitable value therebetween. In one example, COF inside tube green may be between 0.2 and 0.4 or any suitable value therebetween. In one example, COF outside tube green may be between 0.01 and 0.3 or any suitable value therebetween. In one example, COF outside tube aged may be between 0.01 and 0.3 or any suitable value therebetween. In one example, heat seal strength may be about 3 lbs/inch to about 6 lbs/inch. In one example, heat seal strength aged may about 2 lbs/inch to about 4 lbs/inch. In one example, MVTR may be less than about 0.2 g/100 in$^2$/day at 100° F. and 90% RH (Relative Humidity). In one example, OTR may be less than about 20 cc/100 in$^2$/day at 73° F. and 0% RH (Relative Humidity).

EXAMPLES

The following examples are set forth for purposes of illustration only. Parts and percentages appearing in such examples are by weight unless otherwise stipulated. All ASTM, ISO, and other standard test methods cited or referred to in this disclosure are incorporated by reference in their entirety.

Example 1

Formulation and Extrusion

An exemplary multi-layer film in accordance with certain aspects of the present disclosure is provided in the instant example. The multi-layer film in this example is a seven sub-layer co-extruded film. For purposes of illustration, each sub-layer of the multi-layer film is numbered successively in reference to Table 1 of the present disclosure to correlate the sub-layer composition with the sub-layer thickness. The instant example is provided to evaluate the composition and thickness parameters of the exemplary multi-layer film.

A first seal sub-layer (1.1) comprises DuPont™ Surlyn® 1825 and DuPont™ Surlyn® 1601-2 as the ionomer base resins. DuPont™ Conpol® 20S1 was added as a slip agent and Polyfil ABC5000PBMA was added as an antiblock agent. The percentages by weight of the components were about:

| | |
|---|---|
| 67.5% | DuPont™ Surlyn® 1825 |
| 25.0% | DuPont™ Surlyn® 1601-2 |
| 4.0% | DuPont™ Conpol® 20S1 |
| 3.5% | Polyfil ABC5000PBMA |

The resins, slip agent, and antiblock were added to an extruder hopper and combined via blending to provide a formulation. The formulation was then heated in the extruder to form a molten material.

A second seal sub-layer (1.2) comprises Nova Chemicals® SURPASS® HPs167-AB as the base resin. DuPont™ Bynel® 41E710 was added as an adhesive. The percentages by weight of the components were about:

| | |
|---|---|
| 85.0% | Nova Chemicals ® SURPASS ® HPs167-AB |
| 15.0% | DuPont ™ Bynel ® 41E710 |

The resins were added to an extruder hopper and combined via blending to provide a formulation. The formulation was then heated in the extruder to form a molten material.

A first puncture-resistant sub-layer (1.3) comprises BASF® Ultramid® C33 L resin. The percentage by weight was about:

| | |
|---|---|
| 100.0% | BASF ® Ultramid ® C33 L |

The resin was added to an extruder hopper. The resin was then heated in the extruder to form a molten material.

A second puncture-resistant sub-layer (1.4) comprises ExxonMobil® Exceed™ 1018HA as the base layer. DuPont™ Bynel® 41E710 was added as an adhesive. The percentages by weight of the components were about:

| | |
|---|---|
| 85.0% | ExxonMobil ® Exceed ™ 1018HA |
| 15.0% | DuPont ™ Bynel ® 41E710 |

The resins were added to an extruder hopper and combined via blending to provide a formulation. The formulation was then heated in the extruder to form a molten material.

A third puncture-resistant sub-layer (1.5) comprises Total Petrochemicals Polypropylene 4170 polypropylene impact copolymer. The percentage by weight was about:

| | |
|---|---|
| 100.0% | Total Petrochemicals Polypropylene 4170 |

The resin was added to an extruder hopper. The resin was then heated in the extruder to form a molten material.

A first skin sub-layer (1.6) comprises ExxonMobil® Exceed™ 1018HA. The percentage was about:

| | |
|---|---|
| 100% | ExxonMobil ® Exceed ™ 1018HA |

The resin was added to an extruder hopper. The resin was then heated in the extruder to form a molten material.

A second skin sub-layer (1.7) comprises Dow® Elite™ 5960G as the base resin. ExxonMobil® Exceed™ 1018HA was added as an adhesive. The percentages by weight of the components were about:

| | |
|---|---|
| 95.0% | Dow ® Elite ™ 5960G |
| 5.0% | ExxonMobil ® Exceed ™ 1018HA |

The resins were added to an extruder hopper and combined via blending to provide a formulation. The formulation was then heated in the extruder to form a molten material.

The molten materials described above were co-extruded and blown to form a multi-layer film with a gauge of 3.25 mils, a density of 0.9614 g/cm$^3$, and a thickness as described in Table 1.

TABLE 1

Target Sub-layer Thicknesses

| Layer | Thickness (%) | Thickness (mil) |
|---|---|---|
| 1.1 | 12 | 0.390 |
| 1.2 | 8 | 0.260 |
| 1.3 | 9 | 0.293 |
| 1.4 | 8 | 0.260 |
| 1.5 | 10 | 0.325 |
| 1.6 | 8 | 0.260 |
| 1.7 | 45 | 1.463 |

Example 2

Multi-Layer Film Properties

The formulation and process of a multi-layer film in accordance with Example 1 were evaluated. The co-extruded film as described in Example 1 was found to have the properties described in Table 2. Haze % is a measure of how cloudy a film is and tested according to ASTM Method D1003. COF is a unitless measure of how slippery a film is and is tested according to ASTM Method D1894. MVTR is measured according to ASTM Method F1249 and has units of g/100 in$^2$/day at 100° F. and 90% RH (Relative Humidity). OTR is measured according to ASTM D3985 and has units of cc/100 in$^2$/day at 73° F. and 0% RH (Relative Humidity).

TABLE 2

Multi-layer film characteristics

| Characteristic | Target | Upper Limit | Lower Limit |
|---|---|---|---|
| Avg. Basis Weight (Lbs/Ream) | 48.7 | 51.7 | 45.8 |
| Avg. Gauge (mils) | 3.25 | 3.41 | 3.09 |
| Point to Point Gauge Guideline (mils) | 3.25 | 3.71 | 2.80 |
| Haze % | 35.0 | | |
| COF Inside Tube Green | 0.32 | 0.40 | 0.25 |
| COF Inside Tube Aged | 0.32 | 0.40 | 0.25 |
| COF Outside Tube Green | 0.15 | 0.25 | 0.08 |
| COF Outside Tube Aged | 0.12 | 0.20 | 0.06 |
| Heat Seal Strength (#/inch) | 4.5 | 6.0 | 3.0 |
| Heat Seal Strength Aged (#/inch) | 3.0 | 4.0 | 2.0 |
| MVTR | 0.08 | 0.12 | |
| OTR | 10.0 | 20.00 | |

Example 3

Formulation and Extrusion

An exemplary multi-layer film in accordance with certain aspects of the present disclosure is provided in the instant example. The multi-layer film in this example is a nine sub-layer co-extruded film. For purposes of illustration, each sub-layer of the multi-layer film is numbered successively in reference to Table 3 of the present disclosure to correlate the sub-layer composition with the sub-layer thickness. The instant example is provided to evaluate the composition and thickness parameters of the exemplary multi-layer film.

A first seal sub-layer (2.1) may comprise DuPont™ Surlyn® 1825 and DuPont™ Surlyn® 1601-2 as the ionomer base resins. DuPont™ Conpol® 20S1 may be added as a slip agent and Polyfil ABC5000PBMA may be added as an antiblock agent. The percentages by weight of the components may be about:

| | |
|---|---|
| 67.5% | DuPont ™ Surlyn ® 1825 |
| 25.0% | DuPont ™ Surlyn ® 1601-2 |
| 4.0% | DuPont ™ Conpol ® 20S1 |
| 3.5% | Polyfil ABC5000PBMA |

The resins, slip agent, and antiblock may be added to an extruder hopper and combined via blending to provide a formulation. The formulation may be heated in the extruder to form a molten material.

A second seal sub-layer (2.2) may comprise Nova Chemicals® SURPASS® HPs167-AB. The percentage by weight may be about:

| | |
|---|---|
| 100.0% | Nova Chemicals ® SURPASS ® HPs167-AB |

The resin may be added to an extruder hopper. The resin may be heated in the extruder to form a molten material.

A third seal sub-layer (2.3) may comprise ExxonMobil® Exceed™ 1018HA as a base resin. DuPont™ Bynel® 41E710 may be added as an adhesive. The percentages by weight of the components may be about:

| | |
|---|---|
| 85.0% | ExxonMobil ® Exceed ™ 1018HA |
| 15.0% | DuPont ™ Bynel ® 41E710 |

The resins may be added to an extruder hopper and combined via blending to provide a formulation. The formulation may be heated in the extruder to form a molten material.

A first puncture-resistant sub-layer (2.4) may comprise BASF® Ultramid® C33 L resin. The percentage by weight may be about:

| | |
|---|---|
| 100.0% | BASF ® Ultramid ® C33 L |

The resin may be added to an extruder hopper. The resin may then be heated in the extruder to form a molten material.

A second puncture-resistant sub-layer (2.5) may comprise ExxonMobil® Exceed™ 1018HA as the base resin. DuPont™ Bynel® 41E710 may be added as an adhesive. The percentages by weight of the components may be about:

| | |
|---|---|
| 85.0% | ExxonMobil ® Exceed ™ 1018HA |
| 15.0% | DuPont ™ Bynel ® 41E710 |

The resins may be added to an extruder hopper and combined via blending to provide a formulation. The formulation may then be heated in the extruder to form a molten material.

A third puncture-resistant sub-layer (2.6) comprises Total Petrochemicals Polypropylene 4170 polypropylene impact copolymer. The percentage by weight was about:

| | |
|---|---|
| 100.0% | Total Petrochemicals Polypropylene 4170 |

The resin may be added to an extruder hopper. The resin may then be heated in the extruder to form a molten material.

A first skin sub-layer (2.7) may comprise ExxonMobil® Exceed™ 1018HA. The percentages by weight of the components may be about:

| | |
|---|---|
| 100% | ExxonMobil ® Exceed ™ 1018HA |

The resin may be added to an extruder hopper. The resin may then heated in the extruder to form a molten material.

A second skin sub-layer (2.8) may comprise Nova Chemicals® SURPASS® HPs167-AB. The percentage by weight may be about:

| | |
|---|---|
| 100.0% | Nova Chemicals ® SURPASS ® HPs167-AB |

The resin may be added to an extruder hopper. The resin may be heated in the extruder to form a molten material.

A third skin sub-layer (2.9) comprises Dow® Elite™ 5960G as the base resin. ExxonMobil® Exceed™ 1018HA may be added as an adhesive. The percentages by weight of the components may be about:

| | |
|---|---|
| 95.0% | Dow ® Elite ™ 5960G |
| 5.0% | ExxonMobil ® Exceed ™ 1018HA |

The resins and adhesive may be added to an extruder hopper and combined via blending to provide a formulation. The formulation may then be heated in the extruder to form a molten material.

The molten materials described above may be co-extruded and blown to form a multi-layer film with a gauge of 3.25 mils, a density of 0.9619 g/cm³, and a thickness as described in Table 3.

TABLE 3

| Target Sub-layer Thicknesses | | |
|---|---|---|
| Layer | Thickness (%) | Thickness (mil) |
| 2.1 | 12 | 0.390 |
| 2.2 | 12 | 0.390 |
| 2.3 | 7 | 0.228 |
| 2.4 | 10 | 0.325 |
| 2.5 | 7 | 0.228 |
| 2.6 | 10 | 0.325 |
| 2.7 | 9 | 0.293 |
| 2.8 | 15 | 0.488 |
| 2.9 | 18 | 0.585 |

Example 4

Multi-Layer Film Properties

The formulation and process of a multi-layer film in accordance with Example 1 may be evaluated. The multi-layer film as described in Example 1 may have the properties described in Table 4. Haze % is a measure of how cloudy a film is and tested according to ASTM Method D1003. COF is a unitless measure of how slippery a film is and is tested according to ASTM Method D1894. MVTR is measured according to ASTM Method F1249 and has units of g/100 in$^2$/day at 100° F. and 90% RH (Relative Humidity). OTR is measured according to ASTM D3985 and has units of cc/100 in$^2$/day at 73° F. and 0% RH (Relative Humidity).

TABLE 4

Multi-layer film characteristics

| Characteristic | Target | Upper Limit | Lower Limit |
|---|---|---|---|
| Avg. Basis Weight (Lbs/Ream) | 48.8 | 52.7 | 44.9 |
| Avg. Gauge (mils) | 3.25 | 3.45 | 3.06 |
| Point to Point Gauge Guideline (mils) | 3.25 | 3.84 | 2.67 |
| Haze % | 35.0 | | |
| COF Inside Tube Green | 0.32 | 0.40 | 0.25 |
| COF Inside Tube Aged | 0.32 | 0.40 | 0.25 |
| COF Outside Tube Green | 0.15 | 0.25 | 0.08 |
| COF Outside Tube Aged | 0.12 | 0.20 | 0.06 |
| Heat Seal Strength (#/inch) | 4.5 | 6.0 | 3.0 |
| Heat Seal Strength Aged (#/inch) | 3.0 | 4.0 | 2.0 |
| MVTR | 0.08 | 0.12 | |
| OTR | 10.0 | 20.00 | |

Example 5

Multi-Layer Film Test Results

The puncture-resistance of a multi-layer film in accordance with an aspect of the present disclosure was compared to a control film in the instant example. For this example, a multi-layer film in accordance with certain aspects of the present disclosure and a control film were installed on three separate Hayssen Packaging Technologies Ultima bagging machines. Approximately 250 packages made of a multi-layer film in accordance with the present disclosure were formed, filled with a food product, and sealed. The sealed packages were tested in a Water Bath Test to identify any leaks or disruptions in the exterior surface of the packages. Approximately six (2.4%) of the sealed packages failed, which was about a ten-fold improvement compared to the failure rate of the packages made from a control film. The control film is a commercially available five layer film including, from outside to inside, a high-density polyethylene layer, a tie layer, a polyamide layer, a tie layer, and an ionomer sealant layer.

A multi-layer film in accordance with the present disclosure comprises a skin layer, a seal layer located in spaced-apart relation to the skin layer, and a puncture-resistant layer arranged to extend between and interconnect the skin layer and the seal layer. The puncture-resistant layer is configured to provide means for minimizing puncture of the multi-layer film by objects extending through the multi-layer film from the seal layer through the skin layer so that an outer surface of the skin layer remains uninterrupted.

What is claimed is:
1. A multi-layer film comprising
    a skin layer,
    a seal layer located in spaced-apart relation to the skin layer, and
    a puncture-resistant layer arranged to extend between and interconnect the skin layer and the seal layer,
    wherein the puncture-resistant layer includes a first puncture-resistant sub-layer comprising a nylon material, a second puncture-resistant sub-layer, and a third puncture-resistant sub-layer comprising a polypropylene impact copolymer, and the second puncture-resistant sub-layer is arranged to extend between and interconnect the first puncture-resistant sub-layer and the third puncture-resistant sub-layer;
    wherein the layers of the multi-layer film are in order seal layer, first puncture-resistant sub-layer, second puncture-resistant sub-layer, third puncture-resistant sub-layer, and skin layer;
    wherein the skin layer includes a first skin sub-layer comprising an mLLDPE material, a second skin sub-layer comprising about 85% to about 97% by weight HDPE and about 3 to about 15% by weight mLLDPE, and the first skin sub-layer is located between the second skin sub-layer and the puncture-resistant layer;
    wherein the seal layer includes a first seal sub-layer comprising a first ionomer material and a second ionomer material and a second seal sub-layer comprising about 75% to about 95% by weight HDPE and about 5% to about 30% by weight of an anhydride-modified LLDPE, and the second seal sub-layer is located between the first seal sub-layer and the puncture-resistant layer.

2. The multi-layer film of claim 1, wherein the nylon material comprises a copolyamide 6/66 material.

3. The multi-layer film of claim 2, wherein the second puncture-resistant sub-layer is a tie layer comprising a polyethylene material.

4. The multi-layer film of claim 3, wherein the polyethylene material of the second puncture-resistant sub-layer is mLLDPE.

5. The multi-layer film of claim 4, wherein the tie layer further comprises an adhesive.

6. The multi-layer film of claim 1, wherein each of the first skin sub-layer and the second skin sub-layer comprise the same mLLDPE material.

7. The multi-layer film of claim 1, wherein the first seal sub-layer comprises a process additive selected from the group consisting of a slip agent, an anti-block agent, and a combination thereof.

8. The multi-layer film of claim 1, wherein the puncture-resistant layer is between about 20% and about 35% of the total thickness of the multi-layer film.

9. The multi-layer film of claim 8, wherein the skin layer is between about 35% to about 65% of the total thickness of the multi-layer film and the seal layer is between about 10% to about 40% of the total thickness of the multi-layer film.

10. The multi-layer film of claim 1, wherein the multi-layer film consists of seven sub-layers.

11. The multi-layer film of claim 1, wherein the multi-layer film consists of nine sub-layers.

12. The multi-layer film of claim 1, wherein the multi-layer film has a total thickness of about 2.5 mils to about 3.5 mils.

13. The multi-layer film of claim 12, wherein the skin layer is between about 35% to about 65% of the total thickness of the multi-layer film.

14. The multi-layer film of claim 12, wherein the seal layer is between about 10% to about 40% of the total thickness of the multi-layer film.

15. The multi-layer film of claim 1, wherein the multi-layer film has a heat seal strength aged of about 2 lbs/inch to about 4 lbs/inch.

16. The multi-layer film of claim 1, wherein the multi-layer film has a heat seal strength of about 3 lbs/inch to about 6 lbs/inch.

17. The multi-layer film of claim 1, wherein the first ionomer material of the first seal sub-layer is a Zn ionomer.

18. The multi-layer film of claim 17, wherein the first seal sub-layer comprises about 30% to about 80% by weight of the Zn ionomer.

19. The multi-layer film of claim 1, wherein the second ionomer material of the first seal sub-layer is a Na ionomer.

20. The multi-layer film of claim 19, wherein the first seal sub-layer comprises about 15% to about 45% by weight of the Na ionomer.

\* \* \* \* \*